United States Patent
Suzuki et al.

(10) Patent No.: US 9,323,683 B2
(45) Date of Patent: Apr. 26, 2016

(54) STORAGE APPARATUS AND METHOD FOR CONTROLLING INTERNAL PROCESS

(71) Applicant: FUJITSU LIMITED, Kawasaki-shi, Kanagawa (JP)

(72) Inventors: Toshihiko Suzuki, Kawasaki (JP); Hidenori Takahashi, Yokohama (JP); Emi Cho, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 193 days.

(21) Appl. No.: 13/946,510

(22) Filed: Jul. 19, 2013

(65) Prior Publication Data

US 2014/0082276 A1 Mar. 20, 2014

(30) Foreign Application Priority Data

Sep. 19, 2012 (JP) .................. 2012-206157

(51) Int. Cl.
| | |
|---|---|
| G06F 12/02 | (2006.01) |
| G06F 12/08 | (2016.01) |
| G06F 11/34 | (2006.01) |
| G06F 11/20 | (2006.01) |
| G06F 11/10 | (2006.01) |

(52) U.S. Cl.
CPC ........ *G06F 12/0866* (2013.01); *G06F 11/2071* (2013.01); *G06F 11/3485* (2013.01); *G06F 12/0246* (2013.01); *G06F 12/0871* (2013.01); *G06F 11/108* (2013.01); *G06F 11/3409* (2013.01); *G06F 12/0253* (2013.01); *G06F 2201/81* (2013.01); *G06F 2201/88* (2013.01); *G06F 2201/885* (2013.01); *G06F 2212/1016* (2013.01); *G06F 2212/284* (2013.01); *G06F 2212/312* (2013.01); *G06F 2212/7208* (2013.01)

(58) Field of Classification Search
CPC  G06F 12/0246; G06F 12/0253; G06F 3/0688
USPC .................................. 711/103, 154
See application file for complete search history.

(56) References Cited

U.S. PATENT DOCUMENTS

| | | | | |
|---|---|---|---|---|
| 2011/0271071 | A1* | 11/2011 | Nakatogawa ................. | 711/165 |
| 2012/0023305 | A1* | 1/2012 | Satoyama et al. ............ | 711/170 |
| 2013/0024618 | A1* | 1/2013 | Doron ........................... | 711/114 |
| 2013/0046942 | A1* | 2/2013 | Namba et al. ................. | 711/156 |
| 2013/0061019 | A1* | 3/2013 | Fitzpatrick et al. ........... | 711/173 |

FOREIGN PATENT DOCUMENTS

| | | |
|---|---|---|
| JP | 2002-32256 | 1/2002 |
| JP | 2004-178417 | 6/2004 |

\* cited by examiner

*Primary Examiner* — Than Nguyen
(74) *Attorney, Agent, or Firm* — Staas & Halsey LLP

(57) ABSTRACT

According to an aspect of the present invention, provided is a storage apparatus including a plurality of solid state drives (SSDs) and a processor. The SSDs store data in a redundant manner. The processor controls a reading process of reading data from an SSD and a writing process of writing data into an SSD. The processor controls an internal process, which is performed during the writing process, to be performed in each of the SSDs when any one of the SSDs satisfies a predetermined condition.

6 Claims, 20 Drawing Sheets

FIG. 9

SSD RAID GROUP #1

| DATA LENGTH | 8KB($L_1$) | 64KB($L_2$) | 128KB($L_3$) | 256KB($L_4$) | 2MB($L_5$) |
|---|---|---|---|---|---|
| WAITING TIME THRESHOLD VALUE | 50μs | 100μs | 200μs | 300μs | 1ms |

257a — DATA LENGTH row
257b — WAITING TIME THRESHOLD VALUE row
257

SSD RAID GROUP #2

| DATA LENGTH | 8KB($L_1$) | 64KB($L_2$) | 128KB($L_3$) | 256KB($L_4$) | 2MB($L_5$) |
|---|---|---|---|---|---|
| WAITING TIME THRESHOLD VALUE | 20μs | 50μs | 100μs | 200μs | 500μs |

FIG. 15

| TIME | OPERATION OF STORAGE SEEN FROM HOST | OPERATION OF SSDa | OPERATION OF SSDb | OPERATION OF SSDc | OPERATION OF SSDd |
|---|---|---|---|---|---|
| | WRITE PROCESS:0-39CMD | WRITE PROCESS:0-39CMD | WRITE PROCESS:0-39CMD | WRITE PROCESS:0-39CMD | WRITE PROCESS:0-39CMD |
| 10ms | RESPONSE DELAY | INTERNAL PROCESS PROCESSING TIME:30ms | HOLD TIME:30ms | HOLD TIME:30ms | HOLD TIME:30ms |
| 20ms | | | | | |
| 30ms | | | | | |
| | WRITE PROCESS:40-49CMD | WRITE PROCESS:40-49CMD | WRITE PROCESS:40-49CMD | WRITE PROCESS:40-49CMD | WRITE PROCESS:40-49CMD |
| 40ms | RESPONSE DELAY | HOLD TIME:20ms | INTERNAL PROCESS PROCESSING TIME:20ms | HOLD TIME:20ms | HOLD TIME:20ms |
| 50ms | | | | | |
| | WRITE PROCESS:50-59CMD | WRITE PROCESS:50-59CMD | WRITE PROCESS:50-59CMD | WRITE PROCESS:50-59CMD | WRITE PROCESS:50-59CMD |
| 60ms | | | | | |
| 70ms | RESPONSE DELAY | HOLD TIME:30ms | HOLD TIME:30ms | INTERNAL PROCESS PROCESSING TIME:30ms | HOLD TIME:30ms |
| 80ms | | | | | |
| | WRITE PROCESS:60-79CMD | WRITE PROCESS:60-79CMD | WRITE PROCESS:60-79CMD | WRITE PROCESS:60-79CMD | WRITE PROCESS:60-79CMD |
| 90ms | RESPONSE DELAY | HOLD TIME:20ms | HOLD TIME:20ms | HOLD TIME:20ms | INTERNAL PROCESS PROCESSING TIME:20ms |
| 100ms | | | | | |
| 110ms | WRITE PROCESS:80-109CMD | WRITE PROCESS:80-109CMD | WRITE PROCESS:80-109CMD | WRITE PROCESS:80-109CMD | WRITE PROCESS:80-109CMD |
| 120ms | RESPONSE DELAY | INTERNAL PROCESS | HOLD TIME | HOLD TIME | HOLD TIME |
| 130ms | | | | | |

STORAGE APPARATUS AND METHOD FOR CONTROLLING INTERNAL PROCESS

CROSS-REFERENCE TO RELATED APPLICATION

This application is based upon and claims the benefit of priority of the prior Japanese Patent Application No. 2012-206157, filed on Sep. 19, 2012, the entire contents of which are incorporated herein by reference.

FIELD

The embodiments discussed herein are related to a storage apparatus.

BACKGROUND

In recent years, to realize a storage apparatus capable of operating at a high speed, it has been proposed to use a plurality of solid state drives (SSDs) instead of hard disk drives (HDDs). In SSDs, unnecessary data is deleted in units of blocks according to particular timing (hereinafter, this process of deleting unnecessary data will also be referred to as garbage collection).

For example, garbage collection may be performed during a period in which a system using an SSD is in an idle state.

Japanese Laid-Open Patent Publication No. 2002-32256 and Japanese Laid-Open Patent Publication No. 2004-178417 disclose related techniques.

However, in the storage apparatus including a plurality of SSDs, an internal process such as garbage collection performed in the SSDs may cause a reduction in performance. When a plurality of SSDs are arranged in a "RAID 1" configuration which is one of configurations according to. Redundant Array of Inexpensive Disks (RAID) standards, its expected performance is equal to that achieved by a storage apparatus including a single SSD. However, performance achieved actually may be worse than that achieved by the storage apparatus including the single SSD.

For example, expected performance of a storage apparatus including a plurality of SSDs in a "RAID 1" mirror configuration may be about 70% to 80% of that achieved by a storage apparatus including a single SSD. This reduction in performance may be caused by response delays that may occur at different timing among the plurality of SSD in the "RAID 1" configuration. The response delays may be caused by internal processes such as garbage collection that may be different in terms of timing. That is, in the storage apparatus including the plurality of SSDs arranged in the "RAID 1" configuration, when an internal process is being performed in a first one of the SSDs, a second one of the SSDs waits for the internal process in the first one of the SSDs to be completed, and a response is not allowed until the internal process in the first one of the SSDs is completed. On the other hand, when an internal process is being performed in the second one of the SSDs at different timing, the first one of the SSDs waits for the internal process in the second one of the SSDs to be completed and a response is not allowed until the internal process in the second one of the SSDs is completed. Thus, a greater response delay occurs than may occur in the storage apparatus including the single SSD, which results in a reduction in performance.

Note that in a case of a storage apparatus including a plurality of HDDs which are equal in type and storage capacity, internal processes in the HDDs do not cause a reduction in performance. That is, the reduction in performance occurs only when a storage apparatus includes a plurality of SSDs.

The situation described above occurs not only due to garbage collection but a similar situation may occur due to another type of internal process peculiar to SSDs such as a snapshot process which is a process of capturing a data image. Also note that the situation described above occurs not only when a plurality of SSDs are arranged in the "RAID 1" configuration, but a similar situation may also occur in other RAID configurations such as "RAID 5".

SUMMARY

According to an aspect of the present invention, provided is a storage apparatus including a plurality of solid state drives (SSDs) and a processor. The SSDs store data in a redundant manner. The processor controls a reading process of reading data from an SSD and a writing process of writing data into an SSD. The processor controls an internal process, which is performed during the writing process, to be performed in each of the SSDs when any one of the SSDs satisfies a predetermined condition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating an example of a data structure of a third management table according to an embodiment;

FIG. 15 a diagram illustrating a response delay in an SSD in a case where SSDs are arranged in a "RAID 5 (3+1)" configuration according to a conventional technique.

DESCRIPTION OF EMBODIMENTS

A storage apparatus and a method for controlling an internal process according to embodiments are described in detail below with reference to drawings. Note that embodiments are not limited to specific examples described below. Also note that embodiments described below may be combined in various manners unless a combination results in a conflict. In the following description, embodiments of storage apparatus are disclosed.

First Embodiment

Configuration of a Storage Apparatus According to a First Embodiment

Figure 1:
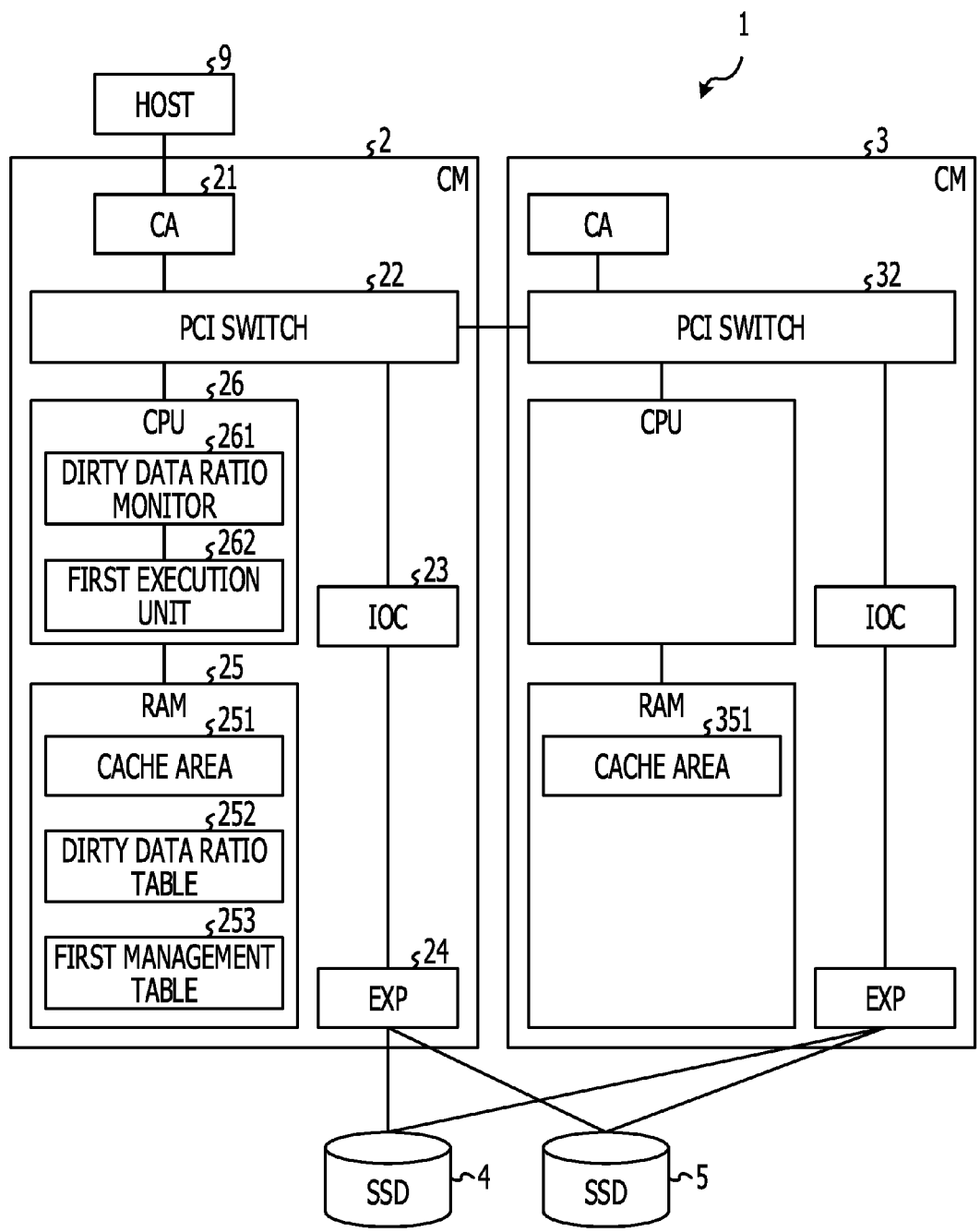
FIG. 1 is a diagram illustrating a hardware configuration of a storage apparatus according to an embodiment.

FIG. 1 is a diagram illustrating a hardware configuration of a storage apparatus according to a first embodiment. As illustrated in FIG. 1, the storage apparatus 1 includes a plurality of controller modules (CMs) 2 and 3, and a plurality of SSDs 4 and 5. Each of the CMs 2 and 3 is connected to the SSDs 4 and 5 such that data is stored in the SSDs 4 and 5 in a redundant manner. Here, it is assumed by way of example that the SSDs 4 and 5 are configured in the form of a "RAID 1 (1+1)", that is, a mirror configuration. Note that the configuration of the plurality of SSDs is not limited to "RAID 1 (1+1)" but other RAID configurations such as "RAID 5 (3+1)" may be used.

The CM 2 includes a channel adapter (CA) 21, a Peripheral Component Interconnect (PCI) switch 22, an input/output controller (IOC) 23, an expander (EXP) 24, a random access memory (RAM) 25, and a central processing unit (CPU) 26. The CM 2 is connected to a host 9, which may be a host computer such as a server. In the following discussion, it is assumed by way of example that the CM 2 receives write data transferred from the host 9 and controls an internal process that is performed during a writing process. Note that the CM 3 is similar in configuration to the CM 2, and thus a further description thereof is omitted.

The internal process is a process that is performed in SSDs. Examples of internal processes include a garbage collection, a snapshot process, and the like. The garbage collection is a process in which unnecessary data is deleted in units of blocks from SSDs when a predetermined timing condition is satisfied. The snapshot process is a process of capturing and holding an image of data when a predetermined timing condition is satisfied. The internal process is not necessarily performed at regular intervals. The internal process tends to be performed after a particular write command (hereinafter also referred to as a WtCMD) is executed or after a particular number of executions of writing is continuously performed. A processing time of one internal process may be changed. For example, the internal process may be performed after about 80 write commands are executed. The processing time of the internal process may be 20 milliseconds, 30 milliseconds, or other values.

The CA 21 is an interface with the host 9. More specifically, for example, the CA 21 may be connected to the host 9 via an interface such as a fiber channel (FC), Internet small computer system interface (iSCSI), or the like.

The PCI switch 22 is a switch functioning as an input/output (IC)) interface according to PCE Express (PCIe) specifications. More specifically, in the present example, the PCI switch 22 is connected to the CA 21, the CPU 26, and the IOC 23 using the PCIe interface. The PCI switch 22 is also connected to a PCI switch 32 in the CM 3 using the PCIe interface.

The IOC 23 controls inputting and outputting of data by the host 9 from and to the SSDs 4 and 5. For example, the IOC 23 receives write data using the PCIe interface and transfers the received write data to the EXP 24 using the Serial Attached small computer system interface (SAS) interface. That is, the IOC 23 functions as a bridge between the PCIe interface and the SAS interface.

The EXP 24 transfers data input or output between the host 9 and the SSDs 4 and 5.

The RAM 25 provides a cache area 251. The cache area 251 is an area used to temporarily store a content of data. More specifically, in an operation of writing data into the SSDs 4 and 5, the cache area 251 is used to temporarily store the data before the data is written into the SSDs 4 and 5. That is, when a free storage space is available in the cache area 251, write data is temporarily written in the cache area 251. On the other hand, in a case where no free storage space is available in the cache area 251, the write data waits until existing data stored in the cache area 251 is written into the SSDs 4 and 5. After the existing data stored in the cache area 251 is written into the SSDs 4 and 5, the write data is temporarily written into the cache area 251. The method of writing data using the cache area 251 in the above-described manner is referred to as a write-back method. Further details of an operation according to the write-back method will be described later.

The RAM 25 stores a dirty data ratio table 252 and a first management table 253. The dirty data ratio table 252 stores a ratio of data (dirty data) which is not yet written into the SSDs 4 and 5 among all the data stored in the cache area 251. The first management table 253 is used to manage the internal process. Further details of the first management table 253 will be described later.

Figure 2A:
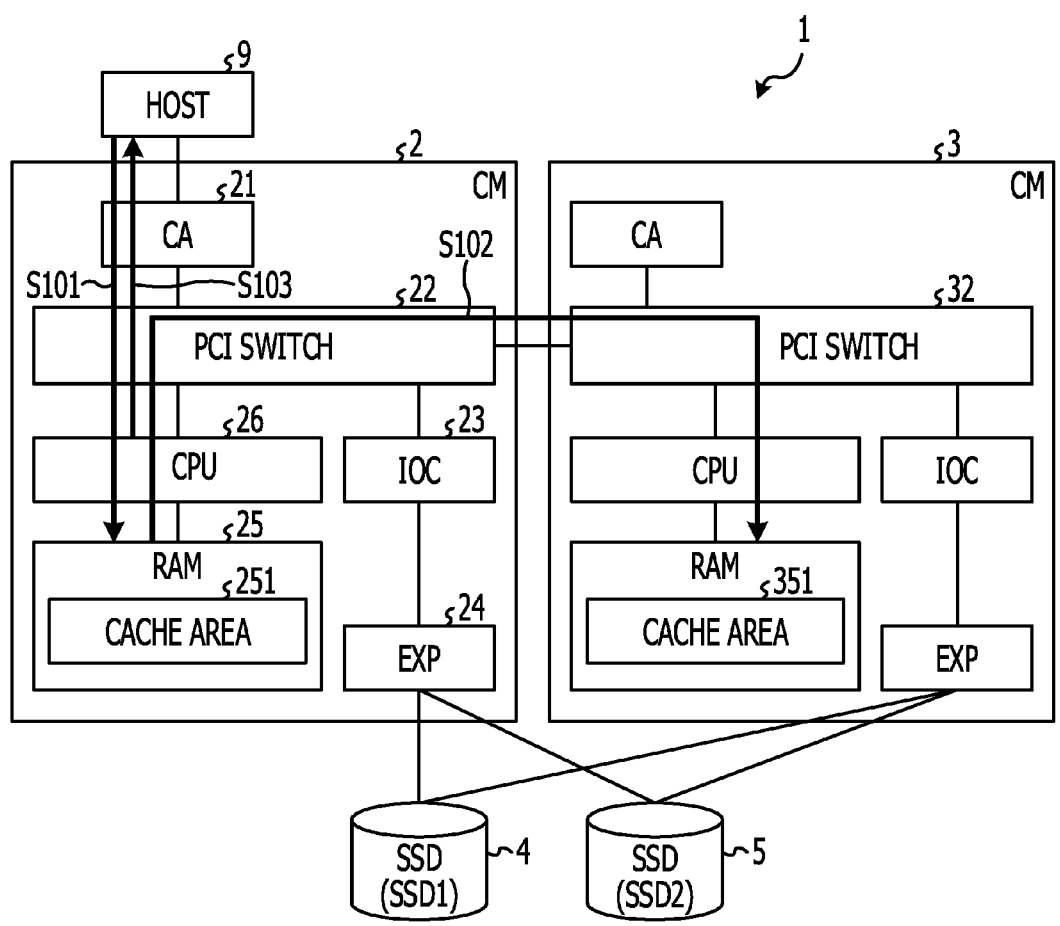
FIG. 2A is a diagram illustrating a write-back writing operation.
Figure 2B:
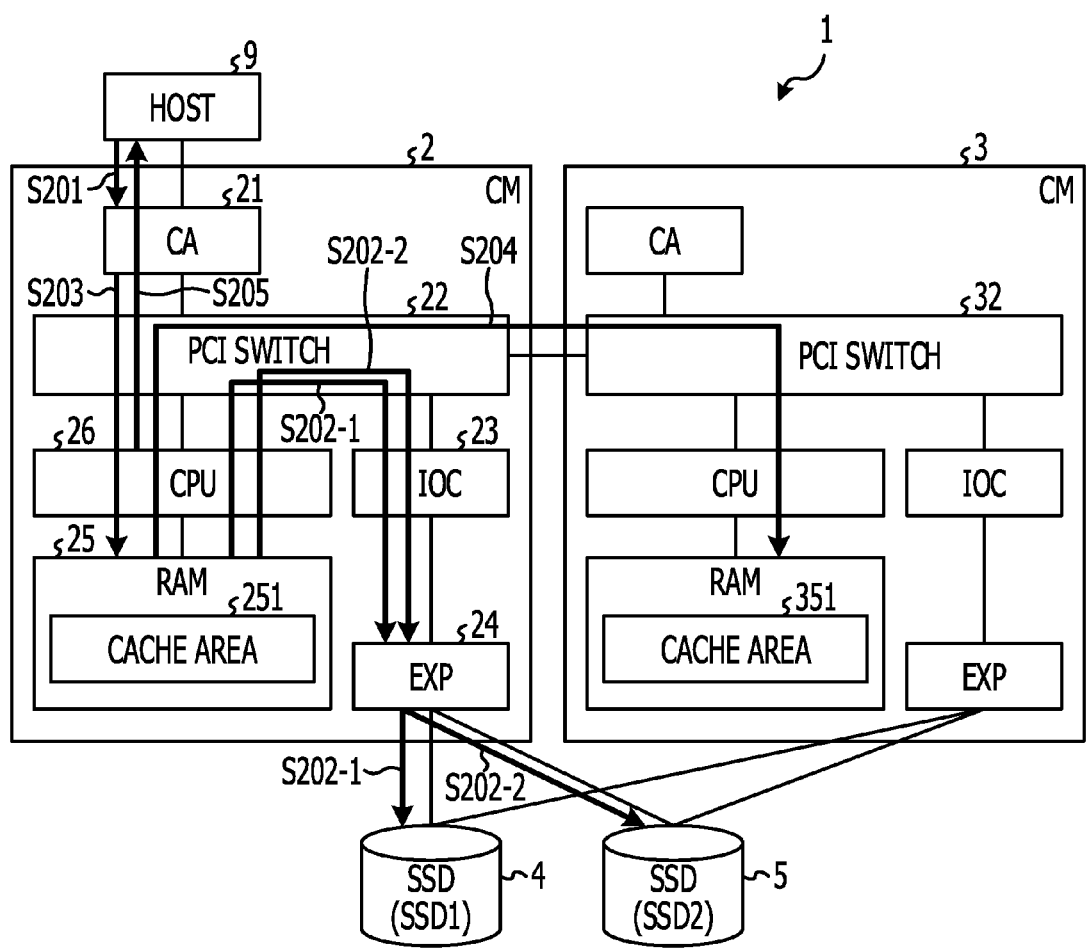
FIG. 2B is a diagram illustrating a write-back writing operation.

The CPU 26 includes an internal memory for storing a program defining various processing procedures and control data, and the CPU 26 executes various processes using the program and the control data. For example, the CPU 26 controls a process of writing and reading data to or from each SSD. More specifically, for example, the CPU 26 performs the writing process using the write-back method. With reference to FIG. 2A and FIG. 2B, the writing operation performed in the storage apparatus 1 using the write-back method is described below. FIG. 2A is a diagram illustrating a writing operation using the write-back method performed in a case where the cache area 251 has a free storage space. FIG. 2B is a diagram illustrating a writing operation using the write-back method performed in a case where the cache area 251 has no free storage space.

In the CM 2, as illustrated in FIG. 2A, the CA 21 receives a write command from the host 9. In the example illustrated in FIG. 2A, the cache area 251 has a free storage space, and thus the CPU 26 receives the write command and transfers the write data to the cache area 251 in the RAM 25 (S101).

The CPU 26 then transfers, via the PCI switch 22, the write data to the cache area 351 of the CM 3 arranged together with the CM 2 in the mirror configuration (S102). Thus, the storage apparatus 1 has duplicate data of the write data. Thereafter, the CPU 26 notifies the host 9 that the writing process specified by the write command is completed (S103).

Next, in the CM 2, as illustrated in FIG. 2B, the CA 21 receives a write command from the host 9. In the state illustrated in FIG. 2B, the cache area 251 has no free storage space, and thus CA 21 holds the write command in a queue (S201). In a case where the queue is full, the CA 21 does not accept following write commands for a temporary period.

Next, to release the cache area 251, the CPU 26 writes the data stored in the cache area 251 into the SSDs 4 and 5 (S202-1, S202-2). After the writing of the data into both SSDs 4 and 5 is completed, the CPU 26 releases the cache area 251.

The CPU 26 then receives the write command held in the queue and transfers the write data to the cache area 251 released (S203). Thereafter, the CPU 26 transfers, via the PCI switch 22, the write data to the cache area 351 of the CM 3 arranged together with the CM 2 in the mirror configuration (S204). The CPU 26 then notifies the host 9 that the writing process specified by the write command is completed (S205).

Referring again to FIG. 1, the CPU 26 functions as a dirty data ratio monitor 261 and a first execution unit 262.

The dirty data ratio monitor 261 monitors the ratio of the dirty data in the cache area 251. For example, the dirty data ratio monitor 261 monitors the ratio of the dirty data in the cache area 251 by with reference to the dirty data ratio stored in the dirty data ratio table 252 periodically at predetermined regular intervals of time. The dirty data ratio stored in the dirty data ratio table 252 is updated by the CPU 26, for example, each time a write command is issued by the host 9.

At a time at which the ratio of the dirty data stored in the cache area 251 is equal to or less than a threshold value, the first execution unit 262 performs an internal process for the plurality of SSDs 4 and 5. That is, when the dirty data ratio is equal to or less than the threshold value, the first execution unit 262 determines that there is a float slack in which data is allowed to remain in the cache area 251 before the data is written into the SSDs 4 and 5 when a write command is issued by the host 9, and thus the first execution unit 262 performs the internal process using this float slack.

More specifically, for example, the first execution unit 262 refers to the dirty data ratio table 252 to determine whether the dirty data ratio is equal to or less than the threshold value. In a case where it is determined that the dirty data ratio is equal to or less than the threshold value, the first execution unit 262 performs the internal process on an SSD to which a write command was issued by the host 9. Note that the first management table 253 manages whether a write command is issued to a particular SSD.

Figure 3:
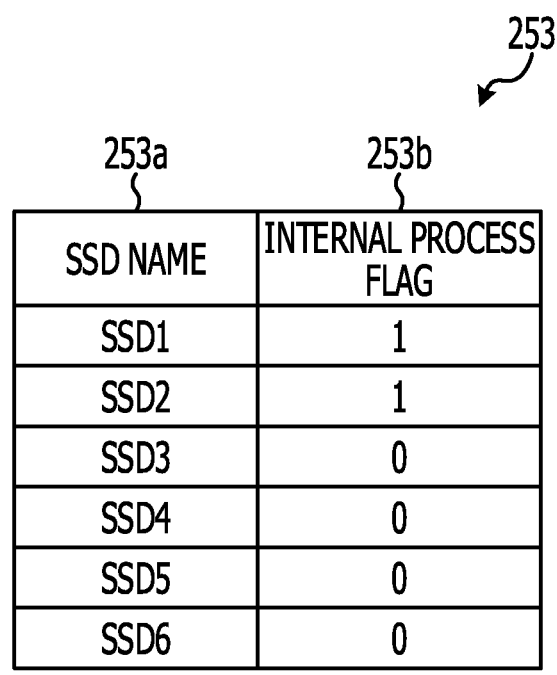
FIG. 3 is a diagram illustrating an example of a data structure of a first management table according to an embodiment.

With reference to FIG. 3, a data structure of the first management table 253 is described below. FIG. 3 is a diagram illustrating an example of a data structure of the first management table according to the first embodiment. As illustrated in FIG. 3, the first management table 253 stores an SSD name 253a in association with an internal process flag 253b. Note that the SSD name 253a is a name given to an SSD. The internal process flag 253b is a flag indicating whether a write command is issued or not. For example, in a state in which no write command is issued, the internal process flag 253b is set to "0", while the internal process flag 253b is set to "1" when a write command is issued.

In the example illustrated in FIG. 3, for an SSD assigned "SSD1" as the SSD name, "1" is set in the internal process flag 253b. For an SSD assigned "SSD2" as the SSD name, "1" is also set in the internal process flag 253b. On the other hand, for an SSD assigned "SSD3" as the SSD name, "0" is stored in the internal process flag 253b.

Referring again to FIG. 1, the first execution unit 262 sets the internal process flags 253b in the first management table 253, for SSDs 4 and 5 to which a write command is issued, a value (for example "1") indicating that the write command is issued. When an internal process is performed on any of SSDs 4 and 5, the first execution unit 262 clears (to, for example, "0") an internal process flag 253b corresponding to an SSD subjected to the internal process.

Internal Process Execution Procedure

Figure 4A:
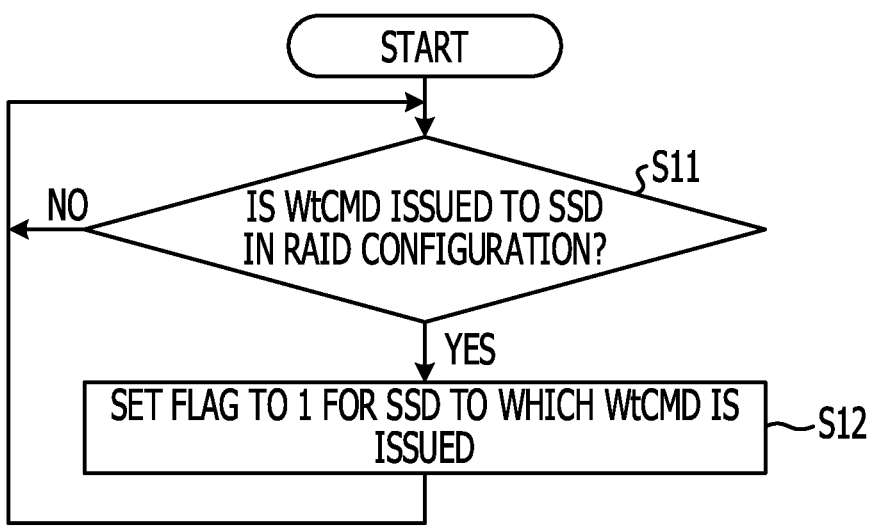
FIG. 4A is a flow chart illustrating an internal process execution procedure according to an embodiment.
Figure 4B:
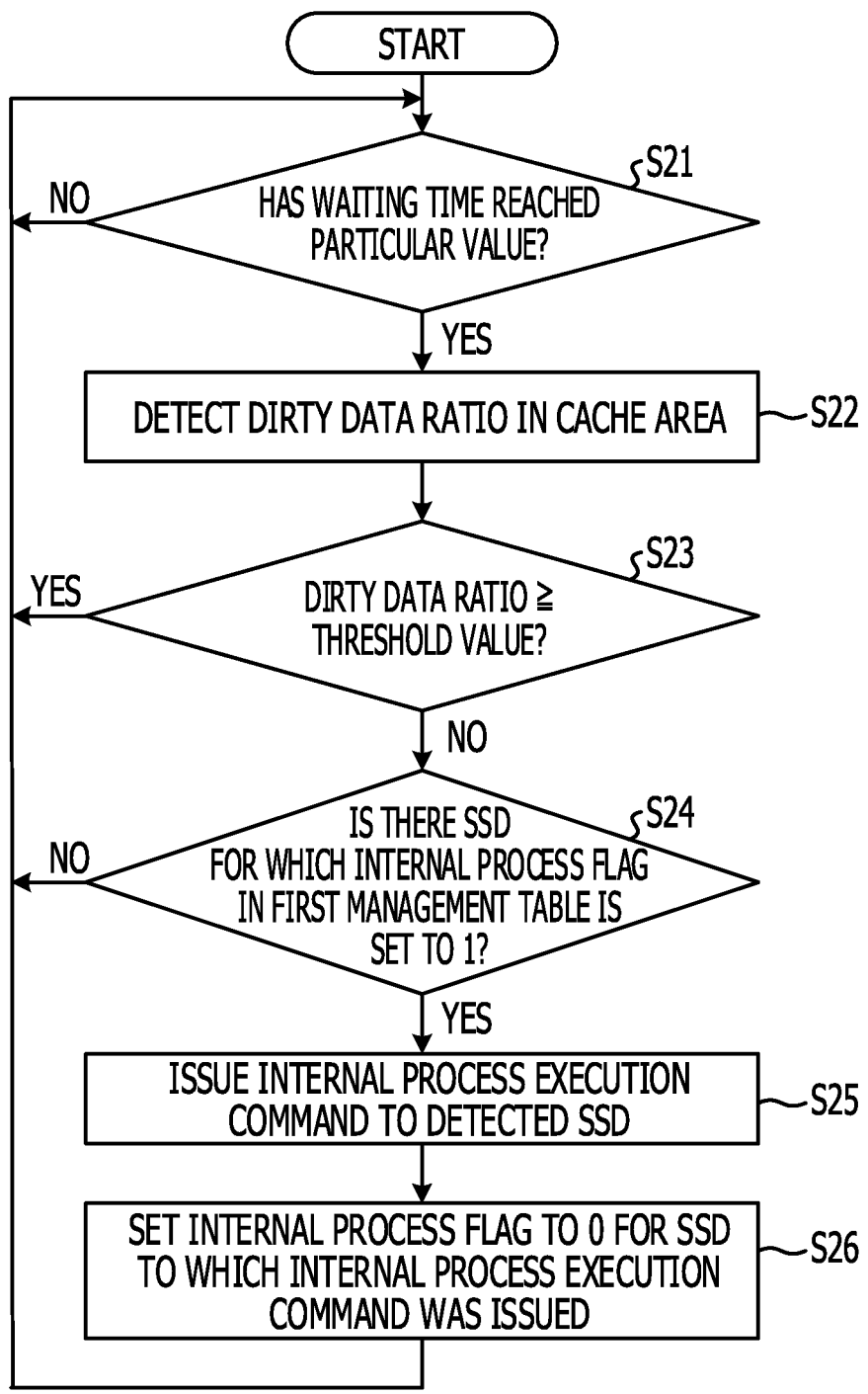
FIG. 4B is a flow chart illustrating an internal process execution procedure according to an embodiment.

With reference to FIG. 4A and FIG. 4B, an internal process execution procedure according to the first embodiment is described below. FIG. 4A and FIG. 4B are flow charts illustrating the internal process execution procedure according to the first embodiment.

As illustrated in FIG. 4A, the first execution unit 262 determines whether a write command is issued to an SSD arranged in the RAID configuration (S11). In a case where it is determined that no write command is issued to any SSD (the answer to S11 is No), the first execution unit 262 performs the determination process described above repeatedly until a write command is issued to some SSD.

In a case where it is determined that a write command is issued to a particular SSD (the answer to S11 is Yes), the first execution unit 262 sets the internal process flag 253b to "1" for the particular SSD to which the write command is issued (S12). The first execution unit 262 then returns the processing flow to S11 to wait for a next write command to be issued.

On the other hand, as illustrated in FIG. 4B, the dirty data ratio monitor 261 determines whether waiting has been performed for a particular period of time (S21). In a case where it is determined that the particular period of time has not elapsed in the waiting (the answer to S21 is No), the dirty data ratio monitor 261 performs the determination process repeatedly until the particular period of time has elapsed.

In a case where it is determined that the particular period of time has elapsed in the waiting (the answer to S21 is Yes), the dirty data ratio monitor 261 detects the ratio of the dirty data in the cache area 251 (S22). The first execution unit 262 determines whether the ratio of the dirty data detected by the dirty data ratio monitor 261 is equal to or greater than the threshold value (S23).

In a case where it is determined that the ratio of the dirty data is equal to or greater than the threshold value (the answer to S23 is Yes), the dirty data ratio monitor 261 returns the processing flow to S21 to wait for a next period of time. In a case where it is determined that the ratio of the dirty data is less than the threshold value (the answer to S23 is No), the first execution unit 262 determines whether there is an SSD for which the internal process flag 253b in the first management table 253 is set to "1" (S24).

In a case where it is determined that there is no SSD for which the internal process flag 253b is set to "1" (the answer to S24 is No), the first execution unit 262 returns the processing flow to S21 to wait for a next period of time. In a case where it is determined that there is an SSD for which the internal process flag 253b is set to "1" (the answer to S24 is Yes), the first execution unit 262 issues an internal process execution command to perform an internal process associated with the SSD for which the internal process flag 253b is set to "1" (S25).

The first execution unit 262 then resets the internal process flag 253b to "0" for the SSD for which the internal process execution command is issued (S26). The first execution unit 262 then returns the processing flow to S21 to wait for a next period of time.

Advantageous Effect of First Embodiment

According to the first embodiment described above, the first execution unit 262 performs an internal process, which may be performed during a data writing process, for the plurality of SSDs 4 and 5 arranged in the RAID configuration when a timing condition described below is satisfied. That is, at a time at which the ratio of the dirty data stored in the cache area 251 is equal to or less than the threshold value, the first execution unit 262 performs the internal process on the plurality of SSDs 4 and 5. In this implementation, the first execution unit 262 determines that there is a float slack in which data is allowed to remain in the cache area 251 before the data is written into (written back into) the SSDs 4 and 5 when a write command is issued. Thus, the first execution unit 262 is allowed to perform the internal process using this float slack in which writing-back is not performed. This makes it possible to suppress a reduction in performance caused by the execution of the internal process.

In the first embodiment, the dirty data ratio monitor 261 monitors the ratio of the dirty data in the cache area 251. At a time at which the ratio of the dirty data stored in the cache area 251 is equal to or less than the threshold value, the first execution unit 262 performs the internal process on the plurality of SSDs 4 and 5. Alternatively, the dirty data ratio monitor 261 may monitor the ratio of the dirty data in the cache area 251 and the ratio of the dirty data in the cache area 351. In this case, at a time at which the ratio of the dirty data stored in the cache area 251 is equal to or less than a threshold value, the first execution unit 262 may perform the internal process on the SSD 4. Furthermore, at a time at which the ratio of the dirty data stored in the cache area 351 is equal to or less than a threshold value, the first execution unit 262 may perform the internal process on the SSD 5. In this implementation, even when SSDs 4 and 5 are not arranged in a RAID configuration, the first execution unit 262 is allowed to perform an internal process for each SSD when there is a float slack in which the internal process is allowed to be performed.

Second Embodiment

In the storage apparatus 1 according to the first embodiment described above, an internal process, which may be performed during a data writing process, is performed in a float slack before data is written (written back) into the SSDs 4 and 5. Alternatively, in the storage apparatus 1, the timing of performing the internal process may be controlled taking into account a tendency that an internal process of the SSDs 4 and 5 is performed after a particular number of writing executions are continuously performed.

Thus, a second embodiment discloses a storage apparatus 1A in which the timing of the internal process for the SSDs 4 and 5 is controlled taking into account the tendency that an internal process of the SSDs 4 and 5 is performed after a particular number of writing executions are continuously performed.

Configuration of a Storage Apparatus According to the Second Embodiment

Figure 5:
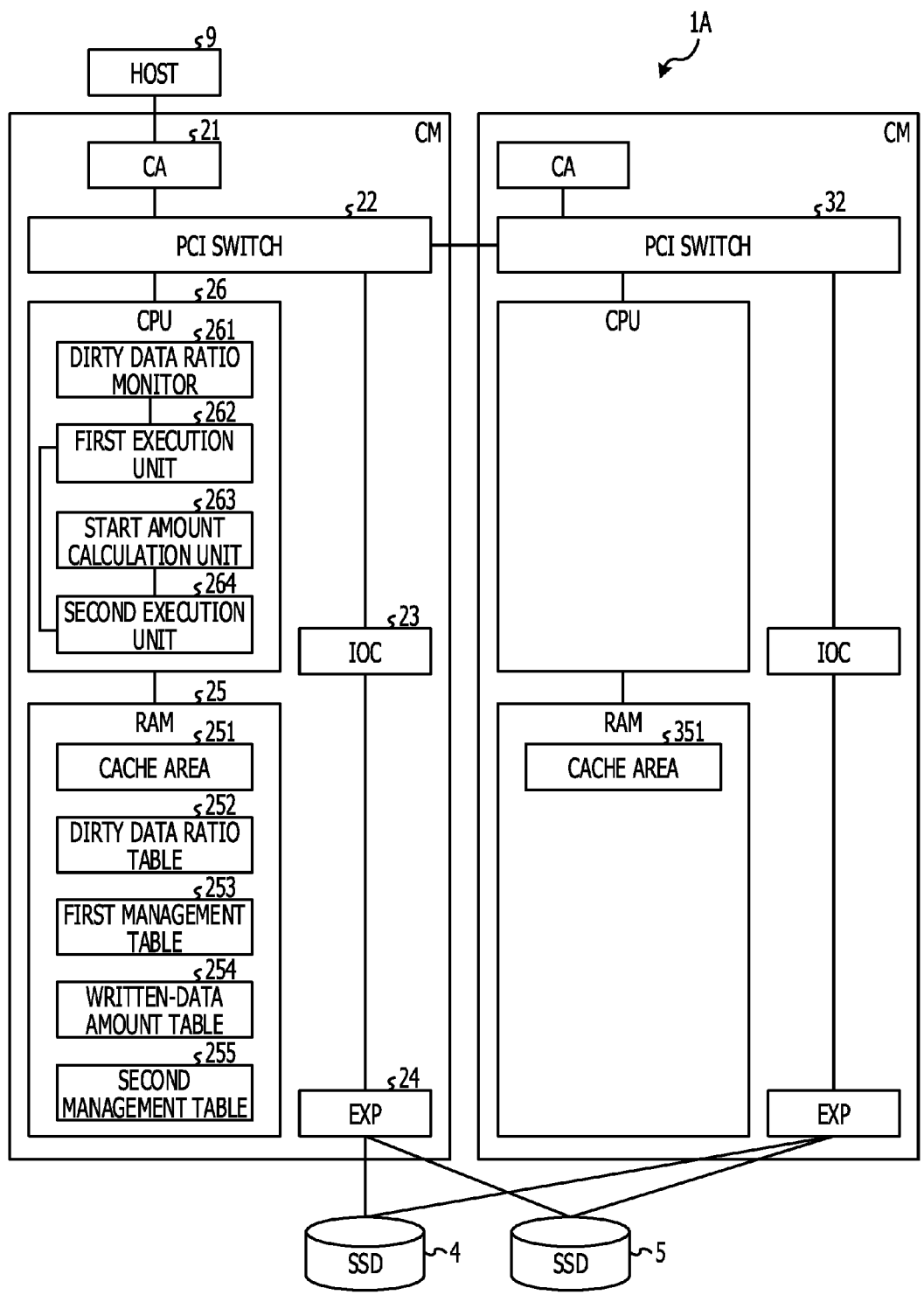
FIG. 5 is a diagram illustrating a hardware configuration of a storage apparatus according to an embodiment.

FIG. 5 is a diagram illustrating a hardware configuration of the storage apparatus according to the second embodiment. Note that elements similar to those in the storage apparatus 1 illustrated in FIG. 1 are denoted by similar reference numerals, and a duplicated description of those similar elements and a description of operations thereof are omitted. The second embodiment is different from the first embodiment in that the CPU 26 further functions as a start amount calculation unit 263 and a second execution unit 264. The second embodiment is also different from the first embodiment in that the RAM 25 further stores a written-data amount table 254 and a second management table 255.

The written-data amount table 254 stores, separately for each of the SSDs 4 and 5, the amount of data written into each SSD after an internal process in each SSD is completed. The amount of written data stored in the written-data amount table 254 separately for each of the SSDs 4 and 5 is updated by the CPU 26, for example, each time a write command is issued by the host 9.

The second management table 255 stores, separately for each SSD, the amount (hereinafter, referred to as the start amount) of data to be written by a time when an internal process is started. The start amount stored for each SSD is calculated by the start amount calculation unit 263. A further detailed description of the second management table 255 will be given later.

To determine the timing of starting the internal process, the start amount calculation unit 263 calculates, in advance, the start amount for each SSD. More specifically, the start amount calculation unit 263 performs the calculation when a RAID volume is created in an SSD RAID configuration. For example, the start amount calculation unit 263 continuously issues write commands each having the similar data size to the SSDs 4 and 5. The data size is typically, for example, 8 Kbytes. In a case where an SSD is a disk (such as a SAS-SSD, an FC-SSD, or the like) that supports a small computer system interface (SCSI) command, the SSD returns an XFER_RDY command indicating that it is ready for writing data. Therefore, in the case where the SSDs are disks that support the SCSI command, the start amount calculation unit 263 measures a waiting time which is a time length from a time at which a write command is issued to the SSD 4 or 5 to a time at which XFER_RDY is returned from the SSD 4 or 5. The waiting time from the time at which the write command is issued to the SSD 4 or 5 to the time at which XFER_RDY is returned from the SSD 4 or 5 is of order of a few microseconds when no internal process is performed, while the waiting time is of order of a few milliseconds when an internal process is performed. Thus, the start amount calculation unit 263 determines whether an internal process is performed or not based on the detected waiting time, and estimates the amount (start amount) of written data that is written by a time at which an internal process is started. The start amount calculation unit 263 stores the start amount for each of the SSDs 4 and 5 in the second management table 255. A further detailed description of the start amount calculation unit 263 will be given later.

Figure 6:
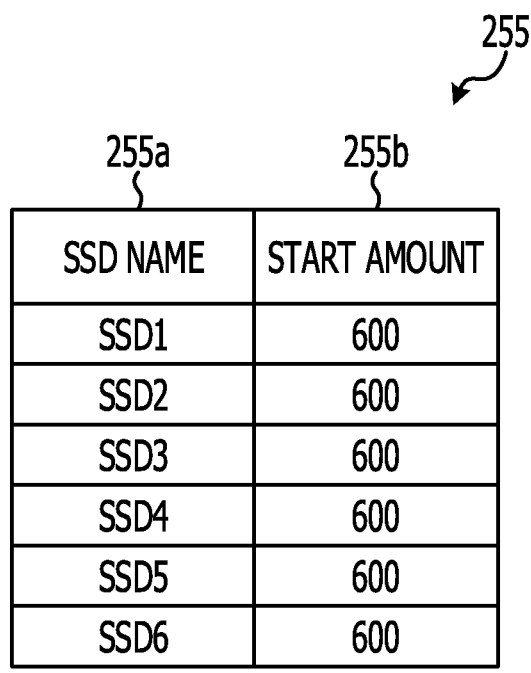
FIG. 6 is a diagram illustrating an example of a data structure of a second management table according to an embodiment.

With reference to FIG. 6, a data structure of the second management table 255 is described below. FIG. 6 is a diagram illustrating an example of a data structure of the second management table according to the second embodiment. As illustrated in FIG. 6, the second management table 255 stores an SSD name 255a in association with a start amount 255b. Note that the SSD name 255a is a name given to an SSD. The start amount 255b is an amount of data to be written by a time when an internal process is started. In the example illustrated in FIG. 6, for an SSD assigned "SSD1" as the SSD name 255a, "600" Kbytes is stored as the start amount 255b.

Referring again to FIG. 5, at a time at which the amount of data written in any one of SSDs becomes equal to or greater than a value that is predicted to cause an internal process to be stared, the second execution unit 264 executes the internal process for the plurality of SSDs 4 and 5. That is, in the execution of internal processes, the second execution unit 264 controls the timing of executing internal processes taking into account the tendency that an internal process of the SSD 4 or 5 is performed after a particular number of writing executions is continuously performed.

More specifically, for example, the second execution unit 264 refers to the written-data amount table 254 and determines whether the amount of written data of any one of the SSDs 4 and 5 in the RAID configuration (or in a RAID group) is equal to or greater than the start amount described in the second management table 255. In a case where it is determined that the amount of written data in some SSD is equal to or greater than the start amount, the second execution unit 264 executes the internal process for the SSDs 4 and 5 in the RAID configuration. That is, the second execution unit 264 controls, according to the execution timing determined statistically, the internal processes for the plurality of SSDs 4 and 5 in the RAID configuration to keep in step with each other. In other words, the second execution unit 264 achieves the synchronization of the internal processes among the plurality of SSDs 4 and 5 in the RAID configuration.

Internal Process Execution Procedure

Figure 7A:
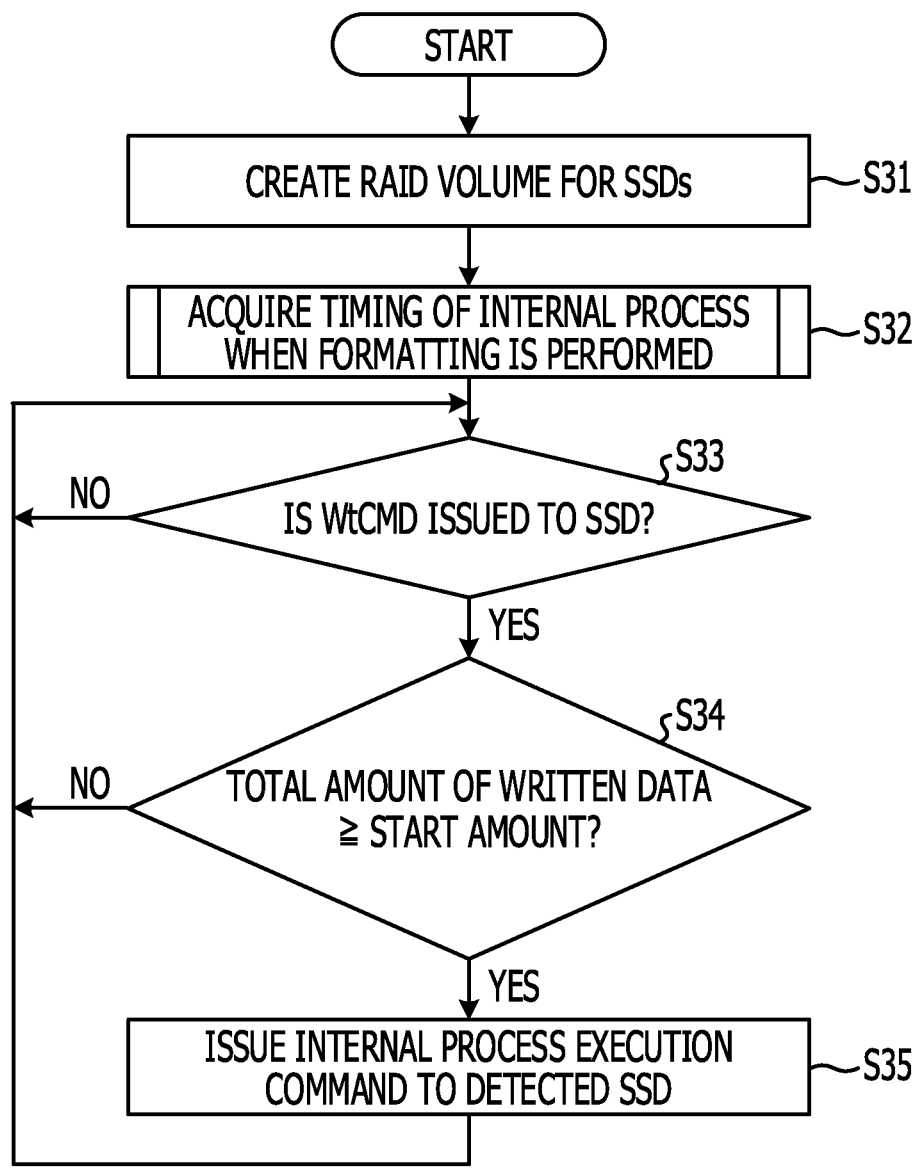
FIG. 7A is a flow chart illustrating an internal process execution procedure according to an embodiment.
Figure 7B:
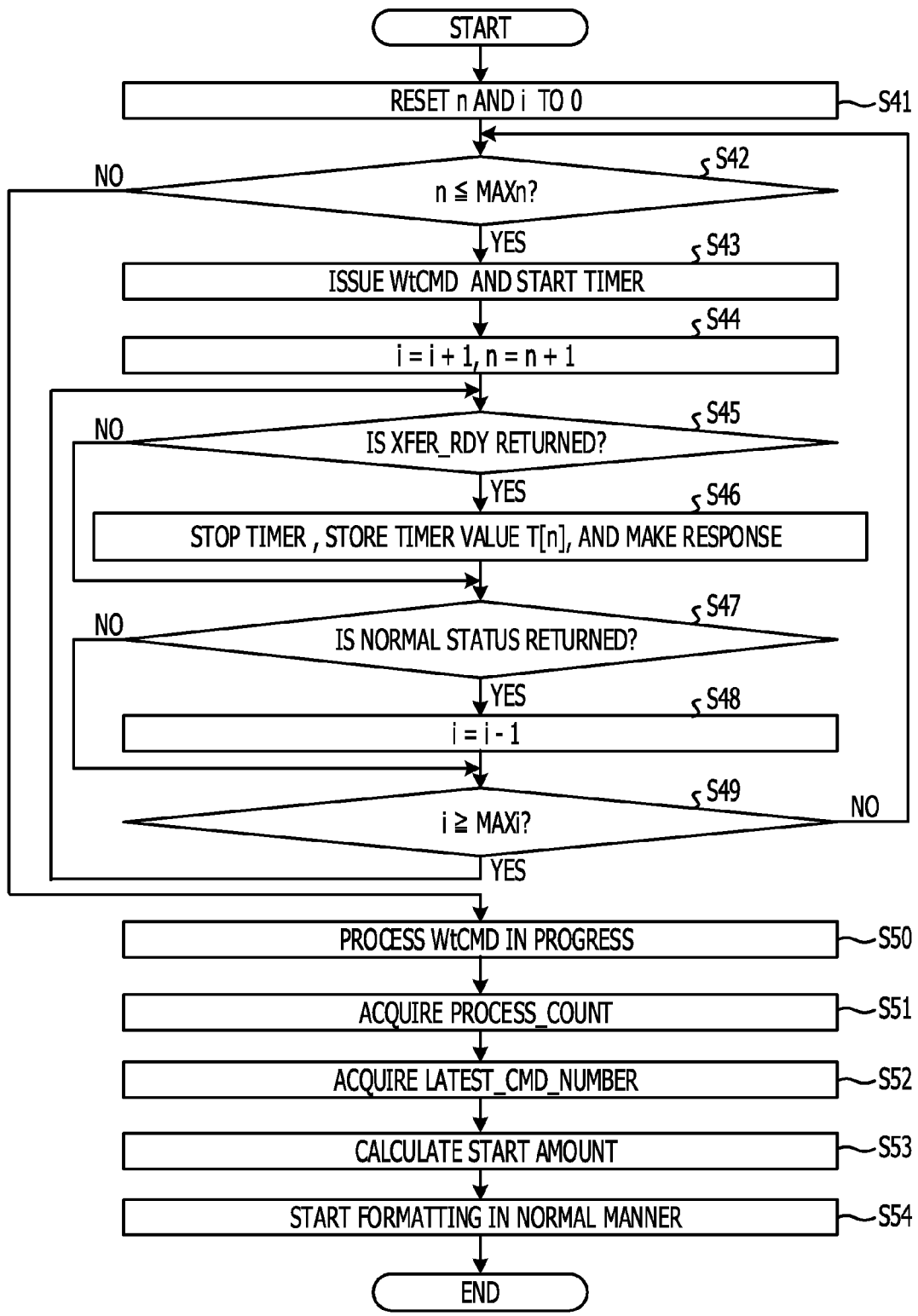
FIG. 7B is a flow chart illustrating a process of calculating an amount of data written by a time when an internal process is started.
Figure 7C:
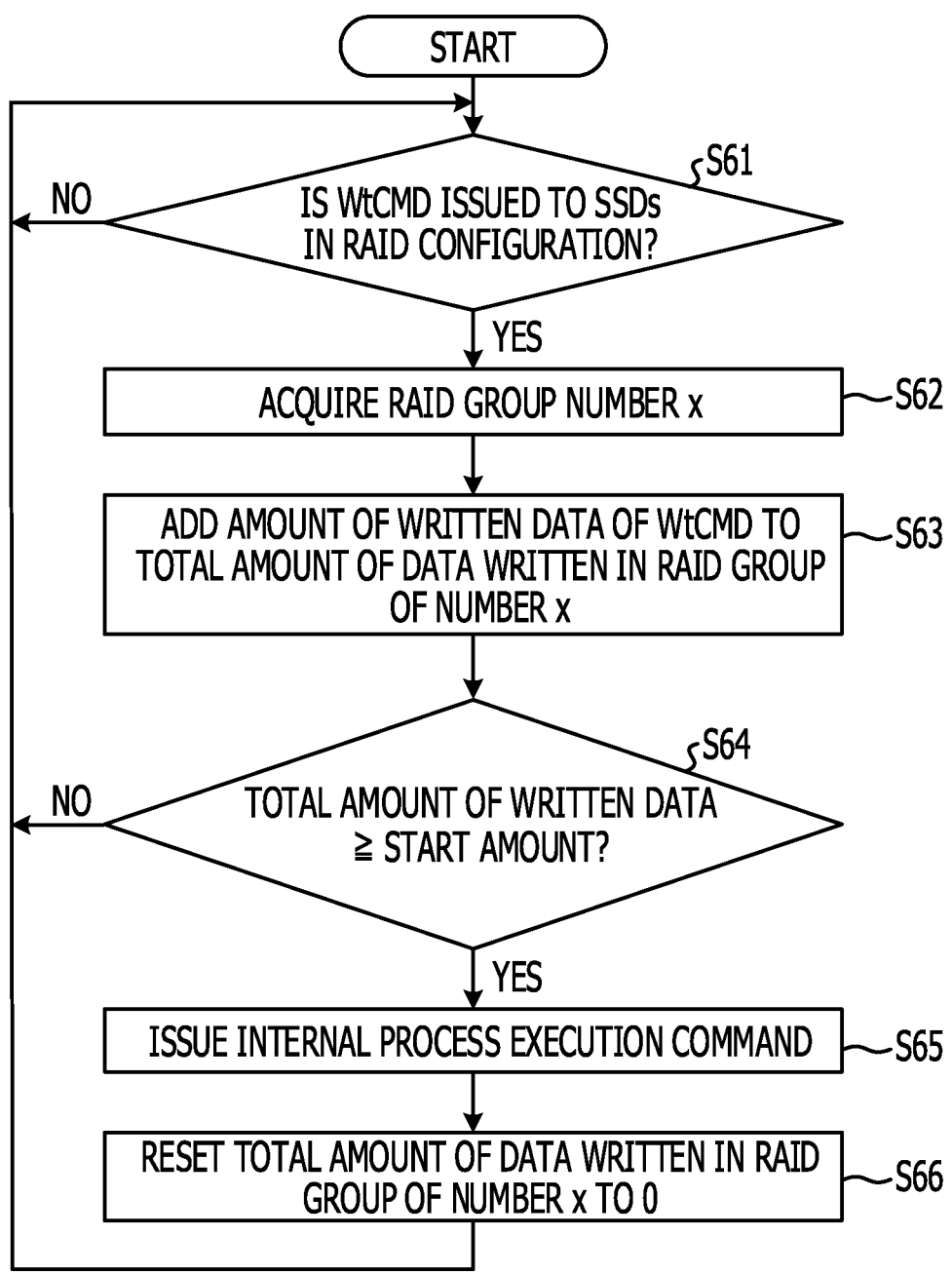
FIG. 7C is a flow chart illustrating a second execution process according to an embodiment.

With reference to FIG. 7A, FIG. 7B, and FIG. 7C, an internal process execution procedure according to the second embodiment is described below. FIG. 7A is a flow chart illustrating the internal process execution procedure according to the second embodiment. FIG. 7B is a flow chart illustrating a start amount calculation process (that is, a process of calculating an amount of data written by a time when an internal process is started). FIG. 7C is a flow chart illustrating a second execution process according to the second embodiment.

In FIG. 7A, when the start amount calculation unit 263 receives a request for creating a RAID volume for the SSDs 4 and 5, the start amount calculation unit 263 creates the RAID volume for the SSDs 4 and 5 (S31). When the created volume is formatted, the start amount calculation unit 263 acquires data indicating the timing of internal process (S32). A further detailed description of the process of acquiring the timing of internal process will be given later with reference to FIG. 7B. Note that the start amount calculation unit 263 acquires a start amount for each of the SSDs 4 and 5.

The second execution unit 264 then determines whether a write command (WtCMD) is issued to the SSD 4 or 5 (S33). In a case where it is determined that a WtCMD is not issued to either one of the SSD 4 and 5 (the answer to S33 is No), the second execution unit 264 performs the determination process repeatedly.

In a case where it is determined that a WtCMD is issued to the SSD 4 or 5 (the answer to S33 is Yes), the second execution unit 264 determines whether the total amount of written data has reached or exceeded the start amount in any one of the SSDs 4 and 5 (S34). In a case where it is determined that the total amount of written data has reached or exceeded the start amount in none of the SSDs 4 and 5 (the answer to S34 is No), the second execution unit 264 returns the processing flow to S33 to wait for a next WtCMD to be issued.

In a case where it is determined that the total amount of written data has reached or exceeded the start amount in some of the SSDs 4 and 5 (the answer to S34 is Yes), the second execution unit 264 issues an internal process execution command to an SSD in which the total amount of written data has reached or exceeded the start amount (S35). Note that the second execution unit 264 issues the internal process execution command also to the other SSDs in the RAID configuration (RAID group) including the SSD in which the total amount of written data has reached or exceeded the start amount. A further detailed description of the internal process execution procedure in S33 to S35 will be given with reference to FIG. 7C.

Start Amount Calculation Process

Next, a start amount calculation process (that is, a process of calculating an amount of data written by a time when an internal process is started) is described below.

As illustrated in FIG. 7B, the start amount calculation unit 263 resets, to 0, the total number n of issued write commands (WtCMDs) and also resets the current number i of issued WtCMDs (S41). The total number n of issued WtCMDs is a variable indicating the number of issued WtCMDs in total. The current number i of issued WtCMDs is a variable indicating the number of currently existing WtCMDs. Note that it is desirable that data to be written in response to a WtCMD is random data, that is, it is not desirable that all data values are equal to 0 or that all data values are equal to 1. The start amount calculation unit 263 determines whether the total number n of issued WtCMDs is equal to or less than a maximum total number MAXn of issued WtCMDs (S42). The maximum total number MAXn of issued WtCMDs is a constant indicating a maximum number of WtCMDs allowed to be issued.

In a case where it is determined that the total number n of issued WtCMDs is equal to or less than the maximum total number MAXn of issued WtCMDs (the answer to S42 is Yes), the start amount calculation unit 263 issues a WtCMD for writing data with a write size (WtSize) of 8 Kbytes to the SSDs 4 and 5 in the RAID configuration in which the volume has been created. When the start amount calculation unit 263 issues a WtCMD, the start amount calculation unit 263 starts a timer corresponding to the issued WtCMD (S43). The start amount calculation unit 263 then increments, by one, both the current number i of issued WtCMDs and the total number n of issued WtCMDs (S44).

Subsequently, the start amount calculation unit 263 determines whether XFER_RDY has been returned (S45). In a case where it is determined that XFER_RDY has been returned (the answer to S45 is Yes), the start amount calculation unit 263 stops the timer corresponding to returned XFER_RDY and stores timer value T[n] indicating a time elapsed since the timer was started. The start amount calculation unit 263 responds to XFER_RDY (S46) and advances the processing flow to S47.

In a case where it is determined that XFER_RDY has not been returned (the answer to S45 is No), the start amount calculation unit 263 advances the processing flow to S47.

In S47, the start amount calculation unit 263 determines whether a normal status has been returned (S47). That is, the start amount calculation unit 263 determines whether a normal processing result corresponding to the WtCMD has been returned. In a case where it is determined that a normal status has been returned (the answer to S47 is Yes), the start amount calculation unit 263 determines that one write process corresponding to the WtCMD has been completed, and thus the start amount calculation unit 263 decrements the current number i of issued WtCMDs by one (S48). The start amount calculation unit 263 then advances the processing flow to S49.

In a case where it is determined that a normal status has not been returned (the answer to S47 is No), the start amount calculation unit 263 advances the processing flow to S49.

In S49, the start amount calculation unit 263 determines whether the current number i of issued WtCMDs is equal to or greater than the maximum current number MAXi of issued WtCMDs per drive (S49). In a case where it is determined that the current number i of issued WtCMDs is equal to or greater than the maximum current number MAXi of issued WtCMDs (the answer to S49 is Yes), the start amount calculation unit 263 returns the processing flow to S45 without issuing a next WtCMD.

In a case where it is determined that the current number i of issued WtCMDs is less than the maximum current number MAXi of issued WtCMDs (the answer to S49 is No), the start amount calculation unit 263 returns the processing flow to S42 to issue a next WtCMD.

In a case where it is determined that the total number n of issued WtCMDs is greater than the maximum total number MAXn of issued WtCMDs (the answer to S42 is No), the start amount calculation unit 263 processes a WtCMD in progress (S50).

The start amount calculation unit 263 then acquires a number (Process_Count) of timers having a timer value equal to or greater than 1 millisecond (S51). That is, the start amount calculation unit 263 acquires the number of timers having a timer value corresponding to internal processes is performed. The start amount calculation unit 263 then acquires an issue number (Latest_CMD_Number) of a WtCMD issued latest of all WtCMDs with timer values equal to or greater than 1 millisecond (S52). Note that the issue number of a WtCMD corresponds to a value of n as of when the WtCMD is issued. The start amount calculation unit 263 then calculates the start amount according to equation (1) described below (S53).

$$\text{start amount} = \text{Latest\_CMD\_Number} \times \text{WtSize} / \text{Process\_Count} \quad (1)$$

The waiting time from the time at which the write command is issued to the SSD 4 or 5 to the time at which XFER_RDY is returned from the SSD 4 or 5 is of order of a few microseconds when no internal process is performed, while the waiting time is of order of a few milliseconds when an internal process is performed. Thus, the start amount calculation unit 263 determines whether an internal process is performed or not by detecting a waiting time of order of a few milliseconds and estimates a start amount, that is, an amount of data written by a time at which an internal process is started. Note that the waiting time corresponds to timer value T[n]. For example, if there are four WtCMDs with a timer value equal to or greater than 1 millisecond, then Process_Count is 4. Furthermore, for example, if 140 is an issue number of a WtCMD issued latest of all WtCMDs with a timer value equal to or greater than 1 millisecond, then Latest_CMD_Number is 140. If it is further assumed in this example that WtSize is 8 Kbytes, then the start amount calculation unit 263 calculates the start amount as 140×8/4=280 Kbytes.

After the calculation of the start amount is completed, the start amount calculation unit 263 starts formatting in a normal manner (S54).

Procedure of Second Execution Process

A procedure of the second execution process according to the second embodiment is described below.

As illustrated in FIG. 7C, the second execution unit 264 determines whether a WtCMD has been issued to the SSD 4 or 5 in the RAID configuration (RAID group) (S61). In a case where it is determined that no WtCMD has been issued to the SSD 4 or 5 in the RAID configuration (the answer to S61 is No), the second execution unit 264 performs the determination process repeatedly until a WtCMD is issued to the SSD 4 or 5.

In a case where it is determined that a WtCMD has been issued to the SSD 4 or 5 in the RAID configuration (the answer to S61 is Yes), the second execution unit 264 acquires a number x of a RAID group to which the WtCMD has been issued (S62). The second execution unit 264 then adds the amount (Bytes) of written data of the WtCMD to the total amount of data written in the RAID group of the number x (S63).

The second execution unit 264 then determines whether the amount of data written in the RAID group of the number x is equal to or greater than the start amount defined for this RAID group (S64). For example, the second execution unit 264 refers to the written-data amount table 254 to retrieve a start amount 255b associated with each SSD in the RAID group of the number x. The second execution unit 264 then determines whether the amount of data written in the RAID group of the number x is equal to or greater than the retrieved start amount 255b. In a case where it is determined that the amount of data written in the RAID group of the number x is less than the start amount corresponding to the RAID group of the number x (the answer to S64 is No), the second execution unit 264 returns the processing flow to S61 to wait for a next WtCMD to be issued.

In a case where it is determined that the amount of data written in the RAID group of the number x is equal to or greater than the start amount corresponding to the RAID group of the number x (the answer to S64 is Yes), the second execution unit 264 issues an internal process execution command to the SSDs 4 and 5 of the RAID group of the number x (S65). The second execution unit 264 then resets the total amount of data written in the RAID group of the number x to 0 (S66). The second execution unit 264 then returns the processing flow to S61 to wait for a next WtCMD to be issued.

Advantageous Effect of Second Embodiment

According to the second embodiment described above, regarding internal processes that may be performed during a process of writing data, the second execution unit 264 controls the timing of executing the internal processes in a plurality of SSDs 4 and 5 as described below. That is, at a time at which the amount of data written in any one of SSDs 4 and 5 becomes equal to or greater than a value (a start amount) that is predicted to cause an internal process to be stared, the second execution unit 264 executes the internal process for the plurality of SSDs 4 and 5. In this implementation, the second execution unit 264 controls the internal processes for the plurality of SSDs 4 and 5 to keep in step with each other by taking into account the tendency that an internal process is performed after a particular number of writing executions is continuously performed. This makes it possible to suppress a reduction in performance caused by the execution of the internal process.

Third Embodiment

In the storage apparatus 1 according to the first embodiment described above, an internal process, which may be performed during a data writing process, is performed in a float slack before data is written (written back) into the SSDs 4 and 5. In the storage apparatus 1A according to the second embodiment, the timing of performing internal processes is controlled taking into account the tendency that an internal process of the SSDs 4 and 5 is performed after a particular number of writing executions are continuously performed. However, the timing of executing internal processes may be controlled in different manners. For example, when an internal process is performed for some SSD in a RAID configuration, an internal process may be performed for the other SSDs (the other one of SSDs 4 and 5) in the RAID configuration.

Thus, in a third embodiment disclosed below, a storage apparatus 1B is configured to control the timing of executing internal processes such that when an internal process is executed for any one of SSDs 4 and 5 arranged in a RAID configuration, an internal process is executed for the other one of the SSDs 4 and 5.

Configuration of a Storage Apparatus According to the Third Embodiment

Figure 8:
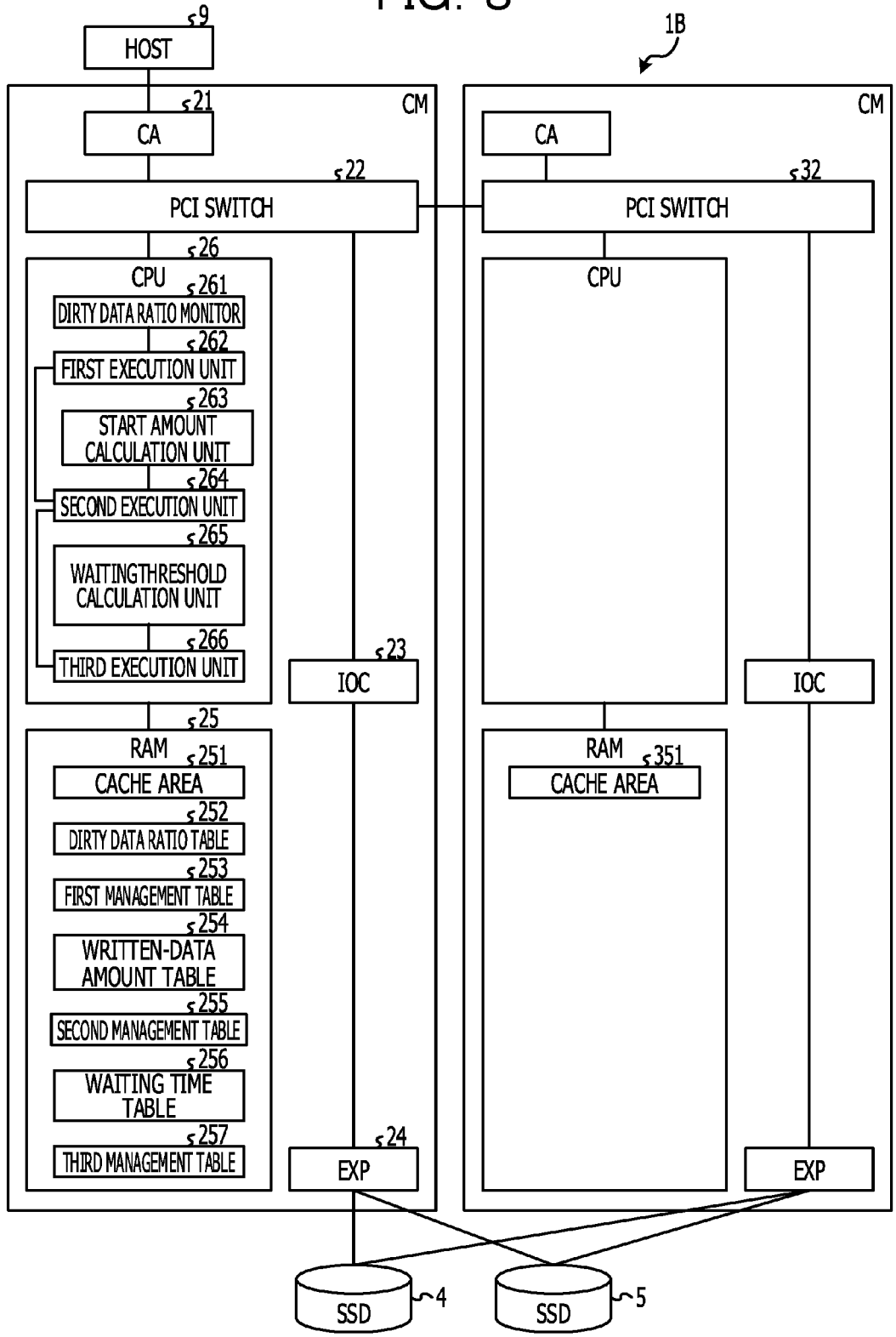
FIG. 8 is a diagram illustrating a hardware configuration of a storage apparatus according to an embodiment.

FIG. 8 is a diagram illustrating a hardware configuration of the storage apparatus according to the third embodiment. Note that elements similar to those in the storage apparatus 1A illustrated in FIG. 5 are denoted by similar reference numerals, and a duplicated description of those similar elements and a description of operations thereof are omitted. The third embodiment is different from the second embodiment in that the CPU 26 further functions as a waiting threshold calculation unit 265 and a third execution unit 266. The third embodiment is also different from the second embodiment in that the RAM 25 further stores a waiting time table 256 and a third management table 257.

The waiting time table 256 stores waiting times separately for respective SSDs 4 and 5. Note that the waiting time is a time length from a time at which a write command is issued to the SSD 4 or 5 to a time at which XFER_RDY is returned from the SSD 4 or 5. Note that the term "waiting time" is used to describe the same meaning elsewhere in the following description unless otherwise defined. XFER_RDY is a notification that is sent from the SSDs 4 and 5 to notify that it is ready for writing data.

The third management table 257 stores a waiting time in a state in which no internal process is performed, individually for each RAID configuration (RAID group). That is, the third management table 257 stores a waiting time, which is a time length from the time at which a write command is issued to the SSDs 4 and 5 to a time at which XFER_RDY is returned from the SSDs 4 and 5, in a state in which no internal process is performed. Further details of the third management table 257 will be described later.

The waiting threshold calculation unit 265 calculates the waiting time in a state in which no internal process is performed as a threshold value of timing of performing an internal process. Note that the waiting threshold calculation unit 265 performs the calculation described above when a RAID volume is created in an SSD RAID configuration. For example, when no internal process is being performed, the waiting threshold calculation unit 265 issues a write command with a data length of, for example, 8 Kbytes to the SSDs 4 and 5. The waiting threshold calculation unit 265 then calculates the waiting time from the time at which the write command is issued to the time at which XFER_RDY is returned. The waiting threshold calculation unit 265 performs the waiting time calculation repeatedly a plurality of times, and calculates an average waiting time for a case where the data length is 8 Kbytes. The calculated average waiting time is employed as the threshold value in terms of the timing of executing an internal process in the case where the data length is 8 Kbytes. Similarly, the waiting threshold calculation unit 265 calculates average waiting times for various data lengths other than the data length of 8 Kbytes. The waiting threshold calculation unit 265 stores the calculated average waiting time for each data length as the threshold value in terms of the timing performing the internal process in the third management table 257. A further detailed description of the waiting threshold calculation unit 265 will be given later.

With reference to FIG. 9, a data structure of the third management table 257 is described below. FIG. 9 is a diagram illustrating an example of a data structure of the third management table according to the third embodiment. As illustrated in FIG. 9, the third management table 257 stores a waiting time threshold value 257b in association with a corresponding data length 257a for each RAID group. Note that the data length 257a is a data length of a write command. The waiting time threshold value 257b is an average waiting time from a time at which a write command of a data length indicated by the data length 257a is issued to a time at which XFER_RDY is returned. That is, the waiting time threshold value 257b is a threshold value of in terms of the timing of performing an internal process.

For example, for an SSD RAID group of a number "1" (#1), when the data length 257a is 8 Kbytes, 50 microseconds is described as the waiting time threshold value 257b. For the SSD RAID group of the number "1", when the data length 257a is 2 Mbytes, 1 millisecond is described as the waiting time threshold value 257b. Depending on the type of the SSD, the waiting time threshold value 257b may not be changed regardless of the value of the data length 257a. In this case, it is sufficient if the waiting time threshold value 257b calculated only for one value of the data length 257a is stored.

At a time at which the waiting time exceeds, in any one of the SSDs, the threshold value defined as the waiting time in a state where no internal process is performed, the third execution unit 266 performs an internal process for the plurality of SSDs 4 and 5. That is, when the waiting time of a write command has exceeded the threshold value in some SSD, the third execution unit 266 determines that an internal process has been started in this SSD of interest and thus the third execution unit 266 executes an internal process for other SSDs in the RAID configuration in which the SSD of interest is located. Thus, the third execution unit 266 is capable of achieving the synchronization of the internal process among the plurality of SSDs 4 and 5 in the RAID configuration.

Internal Process Execution Procedure

Figure 10A:
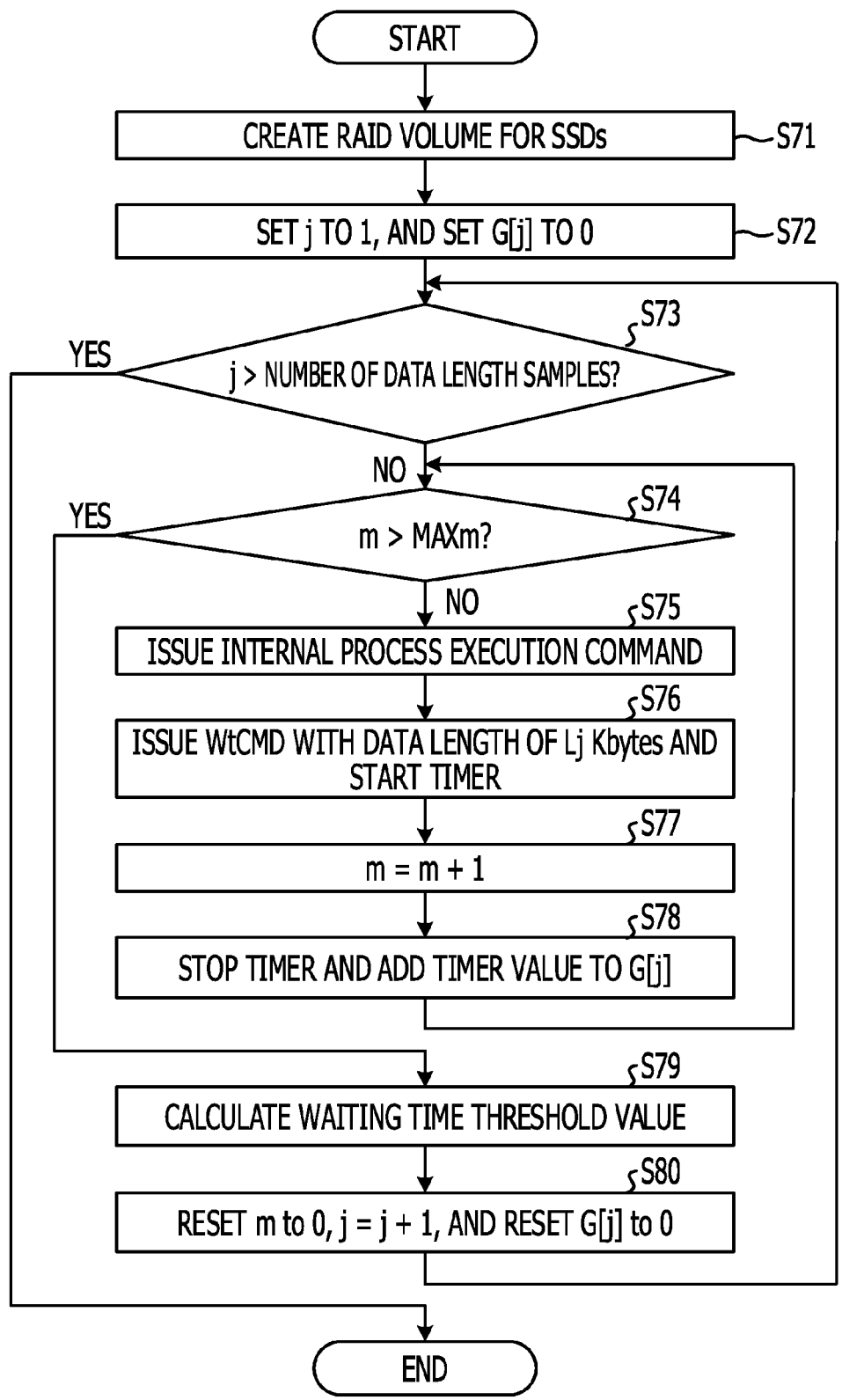
FIG. 10A is a flow chart illustrating a process of calculating a waiting time threshold value according to an embodiment.
Figure 10B:
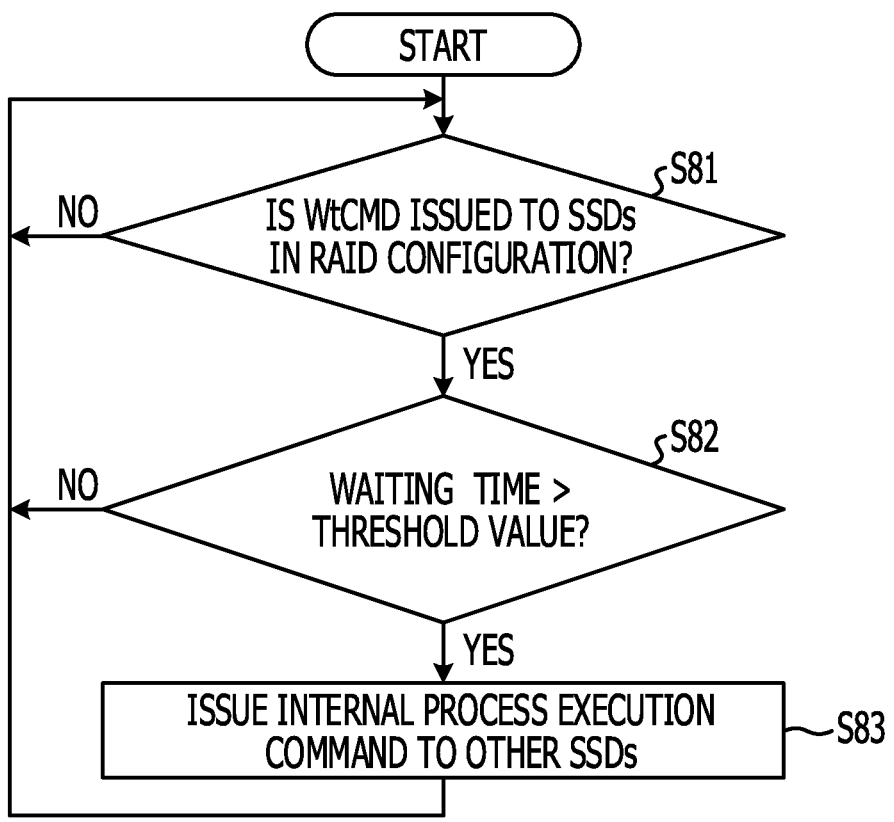
FIG. 10B is a flow chart illustrating a third execution process according to an embodiment.

With reference to FIG. 10A and FIG. 10B, an internal process execution procedure according to the third embodiment is described below. FIG. 10A is a flow chart illustrating the waiting threshold calculation process according to the third embodiment. FIG. 10B is a flow chart illustrating the third execution process according to the third embodiment.

Procedure of Waiting Threshold Calculation Process

As illustrated in FIG. 10A, when the waiting threshold calculation unit 265 receives a request for creating a RAID volume for the SSDs 4 and 5, the waiting threshold calculation unit 265 creates the RAID volume for the SSDs 4 and 5 (S71). The waiting threshold calculation unit 265 then sets a data length number j to 1, and sets a total waiting time G[j] corresponding to the data length number j to 0 (S72). For example, a data length of 8 Kbytes is assigned 1 as the data length number, and a data length of 64 Kbytes is assigned 2 as the data length number. Hereinafter, Lj is used to express a data length corresponding to the data length number j, that is, Lj represents 8 Kbytes, 64 Kbytes, and so on.

The waiting threshold calculation unit 265 then determines whether the data length number j is greater than the number of data length samples (S73). In a case where it is determined that the data length number j is greater than the number of data length samples (the answer to S73 is Yes), the waiting threshold calculation unit 265 ends the process.

In a case where it is determined that the data length number j is not greater than the number of data length samples (the answer to S73 is No), the waiting threshold calculation unit 265 determines whether the current number m of issued WtCMDs is greater than the maximum current number MAXm of issued WtCMDs (S74). In a case where it is determined that the current number m of issued WtCMDs is not greater than the maximum current number MAXm of issued WtCMDs (the answer to S74 is No), the waiting threshold calculation unit 265 issues an internal process execution command to the SSD RAID group in which the volume has been created (S75). By issuing the internal process execution command in advance, it is ensured that no internal process is performed when the waiting time threshold value is being calculated.

When a response is received from the SSDs to which the internal process execution command was issued, the waiting threshold calculation unit 265 issues a write command (WtCMD) with a data length of Lj Kbytes to the SSD RAID group in which the volume has been created. When the waiting threshold calculation unit 265 issues the write command, the waiting threshold calculation unit 265 starts a timer corresponding to the issued WtCMD (S76). Note that it is desirable that data to be written in response to a WtCMD is random data, that is, it is not desirable that all data values are equal to 0 or that all data values are equal to 1. The waiting threshold calculation unit 265 then increments the current number m of issued WtCMDs by 1 (S77).

When XFER_RDY is returned, the waiting threshold calculation unit 265 stops the timer and adds the timer value to the total waiting time G[j] (S78). The waiting threshold calculation unit 265 then returns the processing flow to S74 to issue a next write command.

In a case where it is determined that the current number m of issued WtCMDs is greater than the maximum number MAXm of issued WtCMDs (the answer to S74 is Yes), the waiting threshold calculation unit 265 calculates the waiting time threshold value according to equation (2) described below for a case where data with a data length Lj is written (S79).

$$\text{waiting time threshold value} = \text{total waiting time } G[j] / \text{current number of issued WtCMDs} \quad (2)$$

The waiting threshold calculation unit 265 resets the current number m of CMDs m to 0, increments the data length number j by 1, and resets the total waiting time G[j] to 0 (S80). The waiting threshold calculation unit 265 then returns the processing flow to S73 to calculate a waiting time threshold value for a next data length.

Procedure of Third Execution Process

A procedure of the third execution process according to the third embodiment is described below.

As illustrated in FIG. 10B, the third execution unit 266 determines whether a WtCMD has been issued to the SSDs 4 and 5 in the RAID configuration (RAID group) (S81). In a case where it is determined that no WtCMD has been issued to the SSDs 4 and 5 in the RAID configuration (the answer to S81 is No), the third execution unit 266 performs the determination process repeatedly until a WtCMD is issued to the SSDs.

In a case where it is determined that t a WtCMD has been issued to the SSDs 4 and 5 in the RAID configuration (the answer to S81 is Yes), the third execution unit 266 determines whether the waiting time has exceeded the threshold value in any one of the SSDs 4 and 5 (S82). In a case where it is determined that the waiting time has exceeded the threshold value in none of the SSDs 4 and 5 (the answer to S82 is No), the third execution unit 266 determines that internal process is being performed in none of the SSDs 4 and 5. The third execution unit 266 then returns the processing flow to S81 to wait for a next WtCMD to be issued.

In a case where it is determined that the waiting time has exceeded the threshold value in any one of the SSDs 4 and 5 (the answer to S82 is Yes), the third execution unit 266 determines that an internal process is being performed in an SSD in which the waiting time has exceeded the threshold value. Thus the third execution unit 266 issues an internal process execution command to the other SSDs in the RAID group including the SSD in which the waiting time has exceeded the threshold value (S83). The third execution unit 266 then returns the processing flow to S81 to wait for a next WtCMD to be issued.

Figure 11:
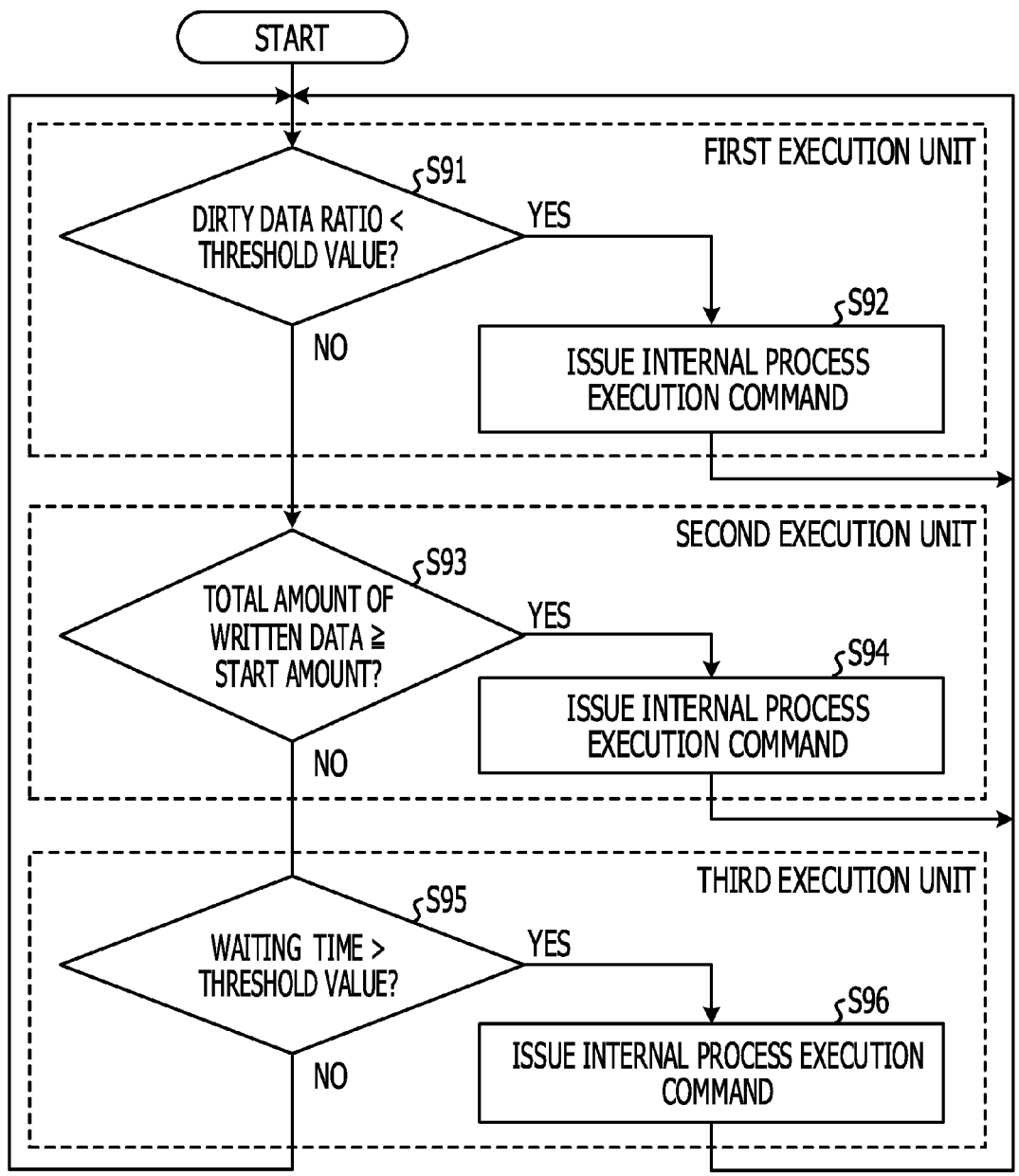
FIG. 11 is a flow chart illustrating a whole internal process execution procedure according to an embodiment.

In the example described above, the internal process execution procedure is performed such that the internal process is performed for the plurality of SSDs 4 and 5 by using the first execution unit 262, the second execution unit 264, and the third execution unit 266. However, the manner of executing the internal process execution procedure is not limited to that described above. For example, the internal process for the plurality of SSDs 4 and 5 may be performed by a combination of part or all of the first execution unit 262, the second execution unit 264, and the third execution unit 266. FIG. 11 is a flow chart illustrating a whole internal process execution procedure according to the third embodiment.

As illustrated in FIG. 11, when a write command (WtCMD) is issued by the host 9, the first execution unit 262 determines whether the ratio of dirty data in the cache area 251 is less than the threshold value (S91). In a case where it is determined that the ratio of dirty data in the cache area 251 is less than the threshold value (the answer to S91 is Yes), the first execution unit 262 issues an internal process execution command to the SSDs 4 and 5 disposed in the storage apparatus 1B (S92). The first execution unit 262 then returns the processing flow to S91.

In a case where it is determined that the ratio of dirty data in the cache area 251 is equal to or greater than the threshold value (the answer to S91 is No), the second execution unit 264 determines whether the total amount of data written in the RAID group has reached or exceeded the start amount (S93). In a case where it is determined that the total amount of data written in the RAID group has reached or exceeded the start amount (the answer to S93 is Yes), the second execution unit 264 issues an internal process execution command to the drive of the RAID group in which the amount of written data has reached or exceeded the start amount (S94). The second execution unit 264 then returns the processing flow to S91.

In a case where it is determined that the total amount of data written in the RAID group is less than the start amount (the answer to S93 is No), the third execution unit 266 determines whether the waiting time has exceeded the threshold value in any one of the SSDs (S95). In a case where it is determined that the waiting time has exceeded the threshold value in one of the SSDs (the answer to S95 is Yes), the third execution unit 266 determines that an internal process is being performed in the SSD in which the waiting time has exceeded the threshold value. Thus the third execution unit 266 issues an internal process execution command to SSDs in the RAID group including the SSD in which the internal process is being performed (S96). The third execution unit 266 then returns the processing flow to S91.

In a case where it is determined that the waiting time until a response is received from each of the SSDs has not exceeded the threshold value (the answer to S95 is No), the third execution unit 266 returns the processing flow to S91.

Figure 12:
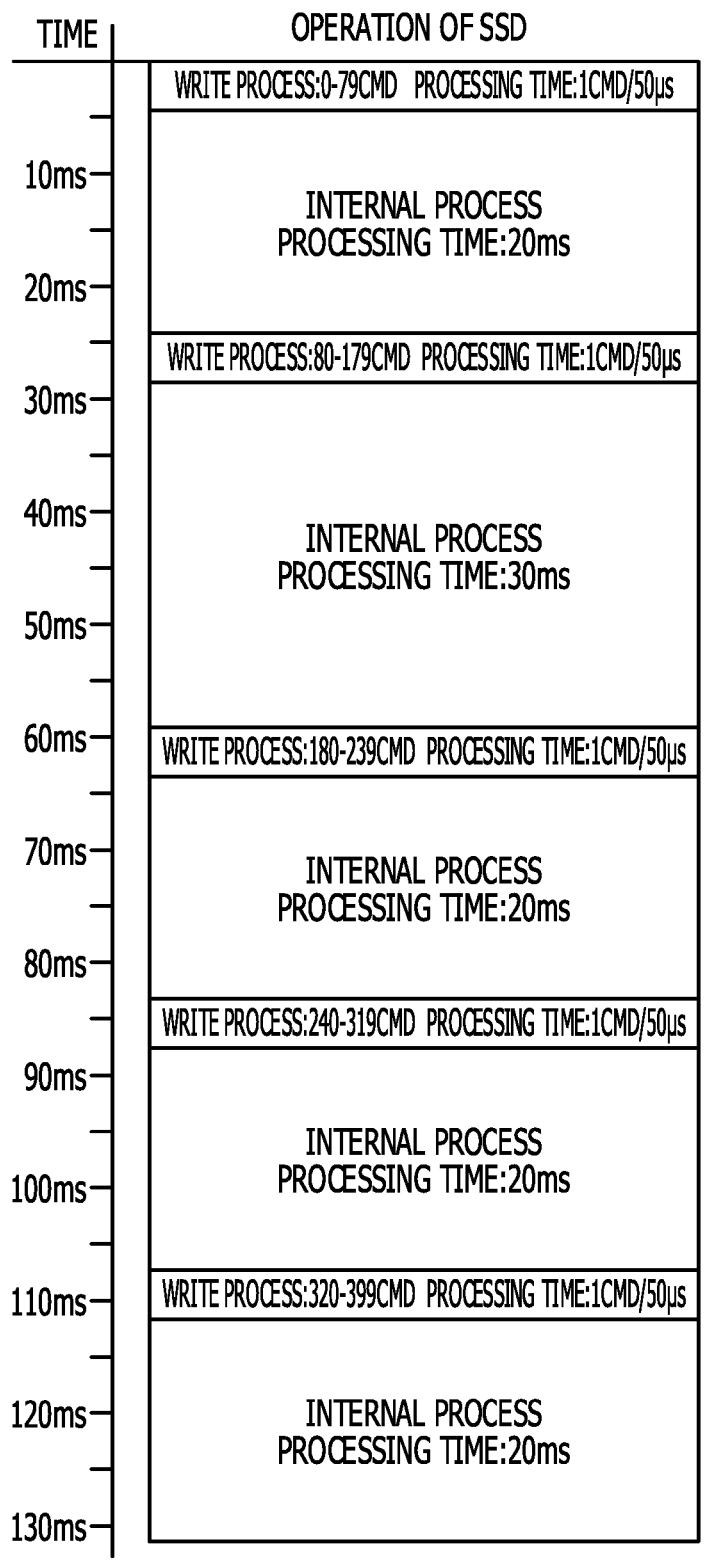
FIG. 12 is a diagram illustrating a response delay in a single SSD.
Figure 13:
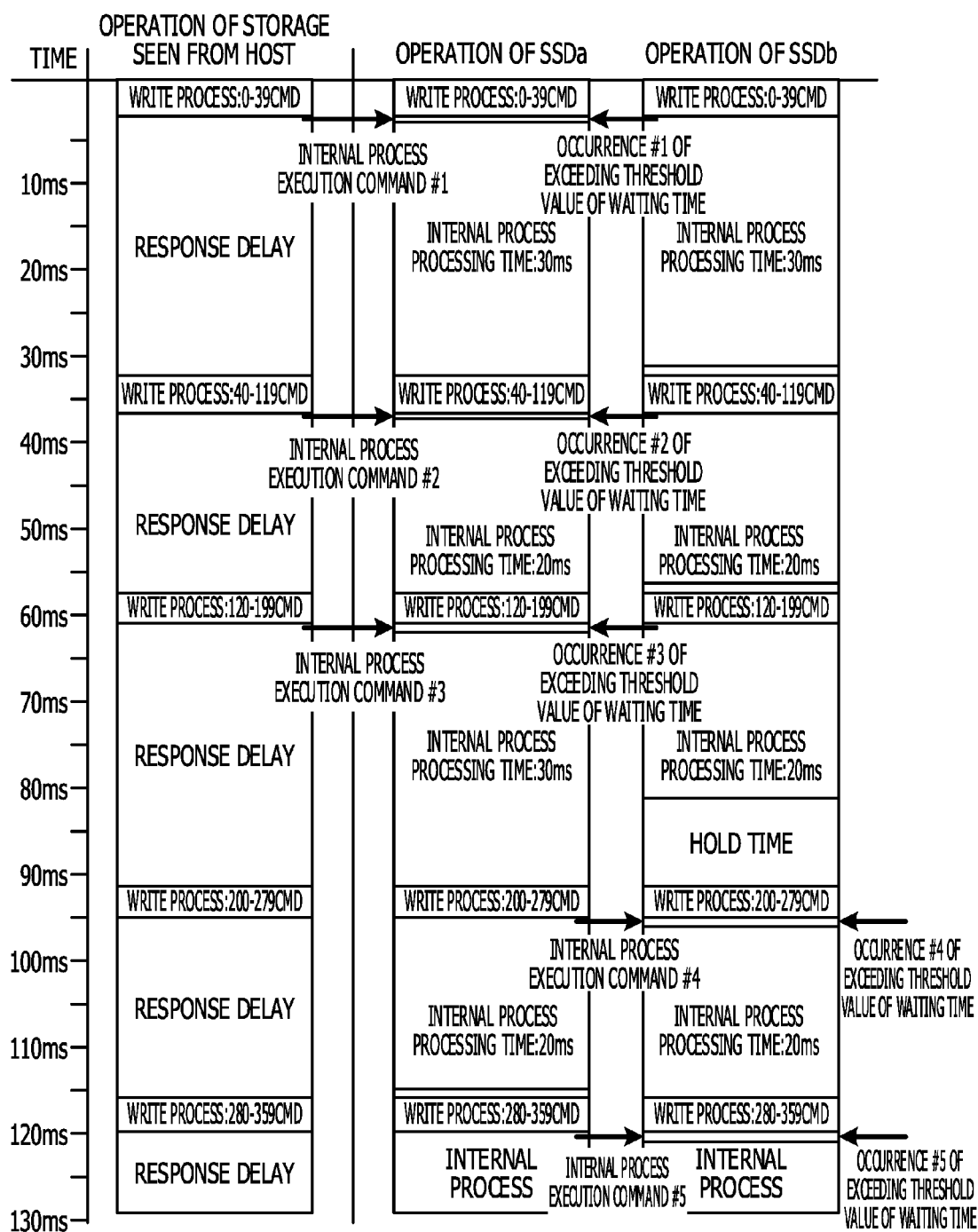
FIG. 13 is a diagram illustrating a response delay in an SSD in a case where SSDs are arranged in a "RAID 1 (1+1)" configuration.
Figure 14:
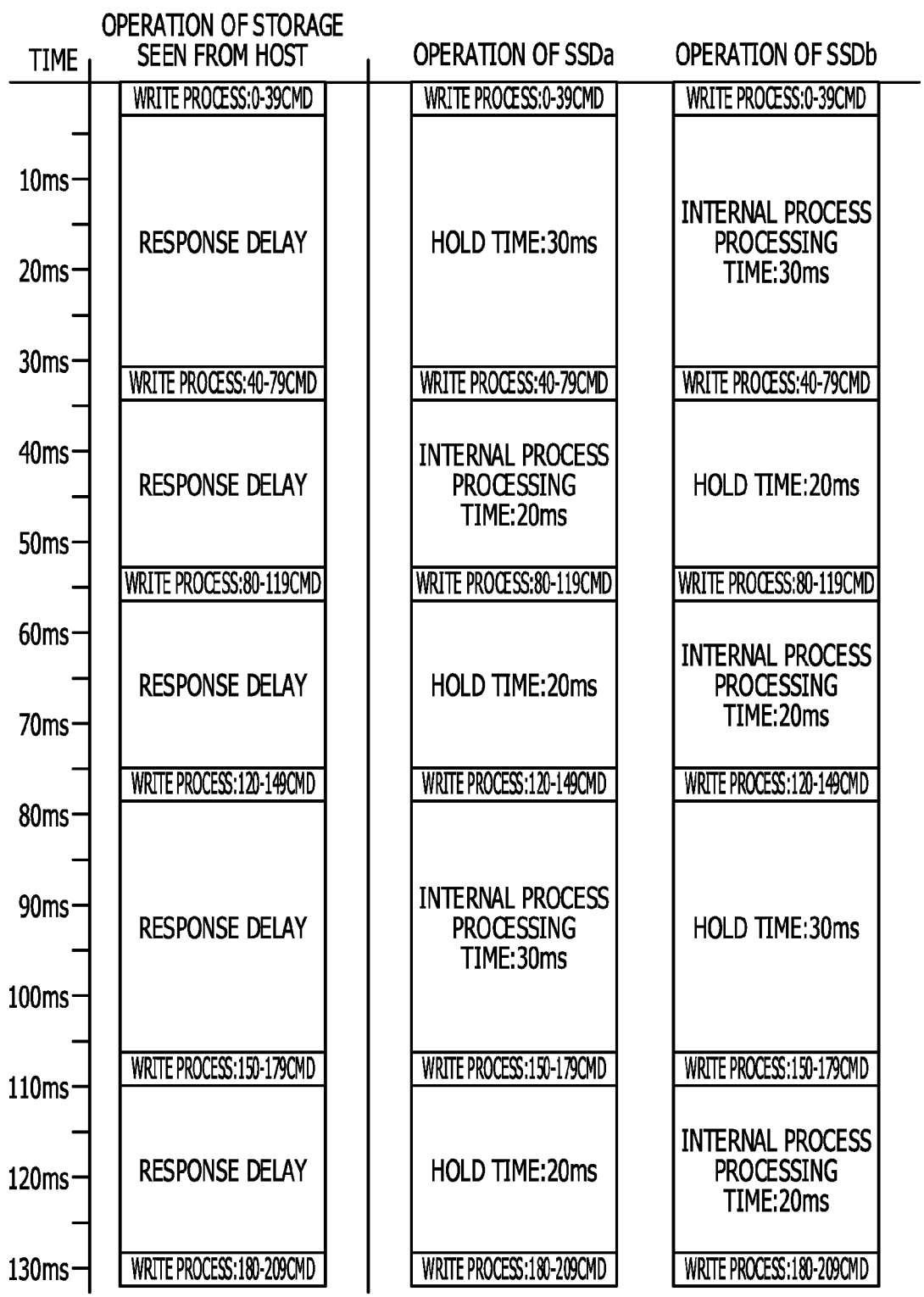
FIG. 14 is a diagram illustrating a response delay in an SSD in a case where SSDs are arranged in a "RAID 1 (1+1)" configuration according to a conventional technique.

With reference to FIGS. 12 to 14, a discussion is given below on a response delay the host 9 may encounter when an internal process is performed by the third execution unit 266 for SSDs (SSDa and SSDb) arranged in the "RAID 1 (1+1)" configuration. First, a manner in which a response delay may occur in a single non-RAID SSD is described below with reference to FIG. 12. FIG. 12 is a diagram illustrating a manner in which a response delay may occur in a single SSD. In the example illustrated in FIG. 12, it is assumed that the host continuously issues write commands (WtCMDs) with a size of 8 Kbytes to an SSD.

As illustrated in FIG. 12, in the case of a single SSD, when each write command (WtCMD) has a size of 8 Kbytes, an internal process is performed once, for example, every 80 WtCMDs. In this example, when 80 WtCMDs from 0th to 79th WtCMD are issued, the SSD returns a response to the host 9 for 79 WtCMDs from 0th to 78th WtCMD immediately after a process corresponding to each WtCMD is completed. However, for a 79th WtCMD, the SSD is not allowed to immediately respond to the host 9 because an internal process is in progress, and the SSD responds to the host 9 after the internal process is completed. Thus, for the 79th WtCMD, a delay in the response to the host 9 occurs by an amount corresponding to an internal processing time.

Next, with reference to FIG. 13, a description is given below as to how a delay in the response to the host 9 occurs in a case where "RAID 1 (1+1)" is formed using SSDs similar to that described above. FIG. 13 is a diagram illustrating a response delay in an SSD in the "RAID 1 (1+1)" configuration. In FIG. 13, as in FIG. 12, it is assumed that an internal process in each SSD is performed once every 80 write commands (WtCMDs), and it is also assumed that a host 9 continuously issues WtCMDs with a size of 8 Kbytes to the SSDs.

As illustrated in FIG. 13, let it be assumed by way of example that the waiting time in the SSDb exceeds the threshold value when a 40th WtCMD is issued by the host 9. In this situation, the third execution unit 266 determines that an internal process has been started in the SSDb and thus the third execution unit 266 issues an internal process execution command to the SSDa belonging to the same RAID configuration including the SSDb. In response, the internal process is performed in the SSDa. Thereafter, when the internal processes in the SSDa and the SSDb are completed, a response is made to the 40th WtCMD issued by the host 9. Thus, for the 40th WtCMD, a delay in the response to the host 9 occurs by an amount corresponding to the internal process time, which is 30 milliseconds in this specific example.

Thereafter, if the waiting time of the SSDb exceeds the threshold value when a 120th WtCMD is issued, then the third execution unit 266 issues an internal process execution command to the SSDa. In response, an internal process is performed in the SSDa. After the internal processes in the SSDa and the SSDb are completed, a response is made to the 120th WtCMD issued by the host 9. Thus, for the 120th WtCMD, a delay in the response to the host 9 occurs by an amount corresponding to the internal process time, which is 20 milliseconds in this specific example.

Thereafter, if the waiting time in the SSDb exceeds the threshold value when a 200th WtCMD is issued, the third execution unit 266 issues an internal process execution command to the SSDa. In response, an internal process is performed in the SSDa. Thus, for the 200th WtCMD, when the internal processes in the SSDa and the SSDb are completed, a response is made to the host 9. That is, for the 200th WtCMD, the processing time for the internal process in the SSDa is 30 milliseconds and the processing time for the internal process in the SSDb is 20 milliseconds, and thus a delay of 30 milliseconds occurs in the response to the host 9, which is determined by the processing time of the internal process in the SSDa.

Thereafter, if the waiting time in the SSDa exceeds the threshold value when a 280th WtCMD is issued, the third execution unit 266 determines that an internal process has been started in the SSDa and thus the third execution unit 266 issues an internal process execution command to the SSDb belonging to the same RAID configuration including the SSDa. In response, the internal process is performed in the SSDb. After the internal processes in the SSDa and the SSDb are completed, a response is made to the 280th WtCMD issued by the host 9. That is, for the 280th WtCMD, a delay in the response to the host 9 occurs by an amount corresponding to the internal process time, which is 20 milliseconds in this specific example.

As described above, the third execution unit 266 has the capability of achieving the synchronization of the internal processes among SSDs in the "RAID 1 (1+1)" configuration. Thus, the third execution unit 266 is capable of reducing the number of WtCMDs that may encounter a response delay due to internal processes in SSDs.

With reference to FIG. 14, a further description is given below as to the reduction in the number of WtCMDs that may encounter a response delay due to internal processes in SSDs. FIG. 14 is a diagram illustrating a response delay in SSDs that may occur in a "RAID 1 (1+1)" configuration according to a conventional technique. In FIG. 14, as in the examples illustrated in FIG. 12 and FIG. 13, it is assumed that an internal process in an SSD is performed once, for example, every 80 write commands, and it is also assumed that the host 9 continuously issues write commands (WtCMDs) with a size of 8 Kbytes to the SSDs.

As illustrated in FIG. 14, let it be assumed by way of example that an internal process is performed in the SSDb when a 40th WtCMD is issued from the host 9. This causes the SSDa to have a hold time while the internal process is being performed in the SSDb. Note that the hold time refers to a time during which a process is in a waiting state without being performed. Thereafter, when the internal process in the SSDb is completed, a response is made to the 40th WtCMD issued by the host 9. That is, for the 40th WtCMD, a delay in the response to the host 9 occurs by an amount corresponding to the internal process time, which is 30 milliseconds in this specific example.

Thereafter, if an internal process is performed in the SSDa when an 80th WtCMD is issued, this causes the SSDb to have a hold time while the internal process is being performed in SSDa. After the internal process in the SSDa is completed, a response is made to the 80th WtCMD issued by the host 9. Thus, for the 80th WtCMD, a delay in the response to the host 9 occurs by an amount corresponding to the internal process time, which is 20 milliseconds in this specific example.

Similarly, for a 120th WtCMD, an internal process is performed in the SSDb, and thus a delay in the response to the host 9 occurs. For a 150th WtCMD, an internal process is performed in the other SSDa, and a delay in the response to the host 9 occurs. That is, in the example of the conventional SSD system illustrated in FIG. 14, a response delay occurs every 40 WtCMDs.

In contrast, in the example of the SSD system illustrated in FIG. 13, a response delay occurs every 80 WtCMDs. That is, the third execution unit 266 is capable of reducing, by half, the number of WtCMDs that encounter a response delay due to an internal process in an SSD.

In the examples described above, it is assumed that SSDs are formed in the "RAID 1 (1+1)" configuration. When SSDs are formed in a "RAID 5 (3+1)" configuration, a greater advantageous effect is achieved. FIG. 15 is a diagram illustrating a response delay in SSDs in the "RAID 5 (3+1)" configuration according to a conventional technique. In FIG. 15, as in the examples illustrated in FIG. 12 to FIG. 14, it is assumed that an internal process in each SSD is performed once, for example, every 80 write commands (WtCMDs), and it is also assumed that a host continuously issues WtCMDs with a size of 8 Kbytes to SSDs.

As illustrated in FIG. 15, let it be assumed by way of example that an internal process is performed in the SSDa when a 40th WtCMD is issued from the host 9. This causes the SSDb, the SSDc, and the SSDd to have a hold time while the internal process is being performed in the SSDa. After the internal process in the SSDa is completed, a response is made to the 40th WtCMD issued by the host 9. That is, for the 40th WtCMD, a delay in the response to the host 9 occurs by an amount corresponding to the internal process time, which is 30 milliseconds in this specific example.

For a 50th WtCMD, an internal process is performed in the SSDb. This causes the SSDa, the SSDc, and the SSDd to have a hold time while the internal process is being performed in the SSDb. Thereafter, when the internal process in the SSDb is completed, a response is made to the 50th WtCMD issued by the host 9. That is, for the 50th WtCMD, a delay in the response to the host 9 occurs by an amount corresponding to the internal process time, which is 20 milliseconds in this specific example.

Similarly, for a 60th WtCMD, an internal process is performed in the SSDc, and thus a delay in the response to the host 9 occurs. For an 80th WtCMD, an internal process is performed in the SSDd, and thus a delay in the response to the host 9 occurs. That is, in the example of the conventional SSD system illustrated in FIG. 15, a response delay occurs every 10 or 20 WtCMDs.

In contrast, in the example of the SSD system illustrated in FIG. 13, a response delay occurs every 80 WtCMDs. That is, the third execution unit 266 is capable of reducing, to ¼ or less, the number of WtCMDs that encounter a response delay due to an internal process in an SSD.

The advantageous effects provided by the third execution unit 266 described above with reference to FIGS. 11 to 14 are also achieved when an internal process is executed by the first execution unit 262 or when an internal process is executed by the second execution unit 264.

Advantageous Effect of Third Embodiment

According to the third embodiment described above, regarding internal processes that are performed during a process of writing data, the third execution unit 266 controls the timing of performing the internal processes in the plurality of SSDs 4 and 5 as described below. That is, at a time at which the waiting time exceeds, in any one of the SSDs, the threshold value defined as the waiting time in a state where no internal process is performed, the third execution unit 266 executes an internal process in an SSD different from the SSD in which the waiting time exceeded the threshold value. In this implementation, the third execution unit 266 is capable of detecting an occurrence of an internal process in an SSD by detecting the waiting time exceeding the threshold value. This makes it possible for the third execution unit 266 to control the timing of executing internal processes such that when an occurrence of an internal process is detected in some SSD, an internal process is executed for the other SSDs. This makes it possible to suppress a reduction in performance caused by the execution of the internal process. That is, the third execution unit 266 is capable of reducing the number of occurrences of delays in the responses to write commands issued by the host 9 compared with the case in which internal processes are performed asynchronously in SSDs.

Other Embodiments

In the first to third embodiments described above, it is assumed that a plurality of SSDs are arranged in a RAID configuration such as "RAID 1 (1+1)", "RAID 5 (3+1)", or the like. However, the configuration of the plurality of SSDs is not limited to RAID configurations, but other configurations may be employed as long as data is allowed to be stored in a redundant manner.

The constituent elements of the storage apparatus 1 do not have to be physically configured in manners as illustrated in figures. That is, part or all of the constituent elements of the storage apparatus 1 may be integrated or divided in various manners depending on various loads or situations in which the storage apparatus 1 is used. For example, the start amount calculation unit 263 and the waiting threshold calculation unit 265 may be integrated into a single unit as an initial calculation unit. Conversely, the first execution unit 262 may be divided into a first monitoring unit and a first internal process execution unit. The second execution unit 264 may be divided into a second monitoring unit and a second internal process execution unit. The third execution unit 266 may be divided into a third monitoring unit and a third internal process execution unit. On the other hand, the tables in the RAM 25 may be stored in an external apparatus connected to the storage apparatus 1 via a network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage apparatus, comprising:
a plurality of solid state drives (SSDs) to store data in a redundant manner; and
a processor to:
control a reading process of reading data from at least one of the SSDs and a writing process of writing data into the at least one of the SSDs, and
perform, during the writing process of the writing data into the at least one of the SSDs, an internal process across the SSDs when determining any one SSD among the SSDs satisfies a condition by issuing a write command for the writing process of the writing data into the SSDs other than the at least one of the SSDs; and
a cache memory to store first data to be written into the SSDs before the first data is written into the SSDs,
wherein the condition is that a ratio of dirty data among all the first data stored in the cache memory is equal to or less than a predetermined value, the dirty data not yet being written into the SSDs.

2. The storage apparatus according to claim 1, wherein the condition is that an amount of data which has been written into any one of the SSDs reaches or exceeds a start amount, the start amount being an estimated amount of data to be written by a time when the internal process is started.

3. The storage apparatus according to claim 1, wherein the condition is that a waiting time in any one of the SSDs exceeds a threshold, the waiting time being a time length from a time at which a write command is issued to an SSD to a time at which a response is made, the threshold being determined based on a waiting time in a state where no internal process is performed.

4. The storage apparatus according to claim 1, wherein the plurality of SSDs are arranged in a Redundant Array of Inexpensive Disks (RAID) configuration.

5. A method for controlling an internal process of a plurality of solid state drives (SSDs) configured to store data in a redundant manner, the method comprising:
   controlling, by a storage apparatus, a reading process of reading data from at least one of the SSDs and a writing process of writing data into the at least one of the SSDs;
   performing, during the writing process of the writing data into the at least one of the SSDs, an internal process across the SSDs when determining any one SSD among the SSDs satisfies a condition by issuing a write command for the writing process of the writing data into the SSDs other than the at least one of the SSDs; and
   storing, to a cache memory, first data to be written into the SSDs before the first data is written into the SSDs,
   wherein the condition is that a ratio of dirty data among all the first data stored in the cache memory is equal to or less than a predetermined value, the dirty data not yet being written into the SSDs.

6. A non-transitory computer-readable recording medium storing a program that causes a computer to execute a procedure for controlling an internal process of a plurality of solid state drives (SSDs) configured to store data in a redundant manner, the procedure comprising:
   controlling a reading process of reading data from at least one of the SSDs and a writing process of writing data into the at least one of the SSDs;
   performing, during the writing process of the writing data into the at least one of the SSDs, an internal process across the SSDs when determining any one SSD among the SSDs satisfies a condition by issuing a write command for the writing process of the writing data into the SSDs other than the at least one of the SSDs; and
   storing, to a cache memory, first data to be written into the SSDs before the first data is written into the SSDs,
   wherein the condition is that a ratio of dirty data among all the first data stored in the cache memory is equal to or less than a predetermined value, the dirty data not yet being written into the SSDs.

* * * * *